US007740533B2

(12) United States Patent
Walker et al.

(10) Patent No.: US 7,740,533 B2
(45) Date of Patent: Jun. 22, 2010

(54) METHOD AND APPARATUS FOR PLAYING VIDEO POKER WITH A REDRAW FUNCTION

(75) Inventors: Jay S. Walker, Ridgefield, CT (US); James A. Jorasch, New York, NY (US); Robert C. Tedesco, Fairfield, CT (US); Magdalena M. Fincham, Ridgefield, CT (US)

(73) Assignee: IGT, Reno, NV (US)

( * ) Notice: Subject to any disclaimer, the term of this patent is extended or adjusted under 35 U.S.C. 154(b) by 254 days.

(21) Appl. No.: 11/258,508

(22) Filed: Oct. 25, 2005

(65) Prior Publication Data

US 2006/0046816 A1 Mar. 2, 2006

Related U.S. Application Data

(60) Provisional application No. 60/622,064, filed on Oct. 25, 2004, provisional application No. 60/622,073, filed on Oct. 25, 2004.

(51) Int. Cl.
*A63F 9/24* (2006.01)
*G06F 17/00* (2006.01)

(52) U.S. Cl. ............................ 463/13; 463/16; 463/17; 463/18; 463/19; 463/20; 463/25; 273/292

(58) Field of Classification Search .................. 463/13, 463/16–20, 25; 273/292
See application file for complete search history.

(56) References Cited

U.S. PATENT DOCUMENTS

| | | | | |
|---|---|---|---|---|
| 4,669,731 | A | 6/1987 | Clarke | 273/143 R |
| 4,743,022 | A | 5/1988 | Wood | 273/85 CP |
| 5,046,735 | A | 9/1991 | Hamano et al. | 273/85 |
| 5,123,649 | A | 6/1992 | Tiberio | 273/143 |
| 5,178,390 | A | 1/1993 | Okada | 273/143 R |
| 5,288,081 | A | 2/1994 | Breeding | 273/292 |
| 5,294,120 | A | 3/1994 | Schultz | 273/85 CP |
| 5,322,295 | A | 6/1994 | Cabot et al. | 273/292 |
| 5,377,973 | A | 1/1995 | Jones et al. | 273/85 CP |
| 5,401,023 | A | 3/1995 | Wood | 273/85 CP |
| 5,411,257 | A | 5/1995 | Fulton | 273/85 CP |
| 5,437,451 | A | 8/1995 | Fulton | 273/138 A |

(Continued)

OTHER PUBLICATIONS

Brochure: "Double Play Black Jack", PDS Gaming, undated.

(Continued)

*Primary Examiner*—Peter DungBa Vo
*Assistant Examiner*—David Duffy
(74) *Attorney, Agent, or Firm*—K&L Gates LLP

(57) ABSTRACT

According to some embodiments of a video poker game of the present invention, a gaming device and/or controller may be configured to (i) output a pay table, (ii) deal an intermediate outcome, (iii) receive a request from a player to retain/discard a number of identified cards of the intermediate outcome, (iv) replace the discarded cards to create a primary game outcome, (v) determine a payout amount associated with the primary game outcome based on the pay table, (vi) determine one or more strategy options based on the primary game outcome to determine a secondary game outcome (e.g., holding selected cards from any in the final poker hand) (vii) determine a payout amount associated with one or more secondary game outcomes, (viii) receive a player selection to receive a strategy option, (ix) deal cards to a selected strategy, (x) determine whether or not the player achieves a winning secondary game outcome, and if so, (xi) output the payout amount associated with the winning secondary game outcome. Thus, in some embodiments, a video poker game of the present invention may allow a player to retain one or more cards of a primary video poker game, select a strategy based on the primary game outcome, and receive a payout if the player achieves a winning game outcome in the secondary game.

26 Claims, 15 Drawing Sheets

U.S. PATENT DOCUMENTS

| | | | | |
|---|---|---|---|---|
| 5,494,287 | A | 2/1996 | Manz | 273/143 |
| 5,531,441 | A | 7/1996 | Dabrowski et al. | 463/12 |
| 5,626,341 | A | 5/1997 | Jones et al. | 273/292 |
| 5,630,753 | A | 5/1997 | Fuchs | 463/9 |
| 5,823,873 | A | 10/1998 | Moody | 463/13 |
| 5,855,514 | A | 1/1999 | Kamille | 463/17 |
| 5,868,619 | A | 2/1999 | Wood et al. | 463/13 |
| 6,024,642 | A | 2/2000 | Stupak | 463/20 |
| 6,045,129 | A | 4/2000 | Cooper et al. | 273/292 |
| 6,050,568 | A | 4/2000 | Hachquet | 273/292 |
| 6,068,552 | A | 5/2000 | Walker et al. | 463/21 |
| 6,089,976 | A | 7/2000 | Schneider et al. | 463/16 |
| 6,098,985 | A | 8/2000 | Moody | 273/292 |
| 6,110,041 | A | 8/2000 | Walker et al. | 463/20 |
| 6,132,311 | A | 10/2000 | Williams | 463/13 |
| 6,135,883 | A | 10/2000 | Hachquet | 463/13 |
| 6,155,925 | A | 12/2000 | Giobbi et al. | 463/20 |
| 6,159,095 | A | 12/2000 | Frohm et al. | 463/19 |
| 6,159,097 | A | 12/2000 | Gura | 463/20 |
| 6,234,897 | B1 | 5/2001 | Frohm et al. | 463/20 |
| 6,270,405 | B1 | 8/2001 | Ferguson | 463/13 |
| 6,270,409 | B1 | 8/2001 | Shuster | 463/20 |
| 6,293,866 | B1 | 9/2001 | Walker et al. | 463/20 |
| 6,312,334 | B1 | 11/2001 | Yoseloff | 463/25 |
| 6,334,613 | B1 | 1/2002 | Yoseloff | 273/292 |
| 6,343,989 | B1 | 2/2002 | Wood et al. | 463/23 |
| 6,390,473 | B1 | 5/2002 | Vancura et al. | 273/292 |
| 6,416,407 | B1 * | 7/2002 | Carrico et al. | 463/13 |
| 6,419,578 | B1 | 7/2002 | Moody et al. | 463/13 |
| 6,435,509 | B2 | 8/2002 | Wichinsky et al. | 273/292 |
| 6,474,645 | B2 | 11/2002 | Tarantino | 273/274 |
| 6,517,074 | B1 | 2/2003 | Moody et al. | 273/292 |
| 6,568,680 | B1 | 5/2003 | Moody et al. | 273/292 |
| 6,595,520 | B1 | 7/2003 | Richards et al. | 273/292 |
| 6,660,198 | B1 | 12/2003 | Fischer | 264/138 |
| 6,669,198 | B2 | 12/2003 | Wichinsky | 273/292 |
| 6,672,958 | B2 | 1/2004 | Bennett | 463/13 |
| 6,672,959 | B2 | 1/2004 | Moody et al. | 463/13 |
| 6,780,104 | B2 | 8/2004 | Fox | 463/13 |
| 7,306,517 | B1 * | 12/2007 | Forbes | 463/13 |
| 2003/0164590 | A1 | 9/2003 | Moody | 273/292 |
| 2003/0214097 | A1 | 11/2003 | Moody | 273/292 |
| 2004/0043807 | A1 | 3/2004 | Pennington | 463/13 |
| 2004/0188938 | A1 | 9/2004 | Moody et al. | 273/292 |

OTHER PUBLICATIONS

Website: "Blackjacks Online Casino—Paigow Poker", (http //www blackjacksonlinecasinocom/paigow html), download date: Sep. 7, 2001.

Website: "Hustler How-To For Lowball", (http //www hustlergaming com/lowNoFlash html), download date: Oct. 4, 2001.

Website: "Wireplay Poker", (http www wireplay com au/scripts/ Games asp?GameID2=56&I=2), download date: Oct. 4, 2001.

Website: "Pick'em Video Poker", Video Poker 1, (http //www videopokerl com), copyright 2002.

Smolen, Don, "CPOKER", (http //conjelco com/software html), download date: Feb. 14, 2003.

Website: "Rules of the Game—3.4 Splitting Pairs", (http //www blackjackinfo com/bjrules htm), download date: Feb. 14, 2003.

Website: "Rules of the Game—3.1 Surrender", (http //www blackjackinfo com/bjrules htm), download date: Feb. 14, 2003.

Waldman, Hilary, "Cornering jackpot: impossible feat?; Cornering jackpot almost impossible, official says", The Hartford, Courant, Feb. 29, 1992, Section: Connecticut, p. C1.

"I'll take 4,000 tickets please" "No, I'm not from Australia", Business Wire, Mar. 17, 1993.

"Hot Slots & Reel Deals", Atlantic City Insider, Oct. 1996, vol. 1, No. 2.

"Frequently Asked Questions", Vermont State Lottery Commission, Copyright 2000-2001.

Renzy, Fred, "Roulette is an easy play, no-skill game for novice gamblers", Chicago Daily Herald, Sep. 8, 2000, Section: Time Out!, Riverboat Gambling, p. 15.

Grochowski, John, "Casinos aren't offering early surrender option", Chicago Sun-Times, May 4, 2001, Section: Weekend Plan, Gaming, p. 23.

Website: "Money Time at Casino Windsor", (http //www casinowindsor com/casino/slots/moneytime htm), download date: Jul. 25, 2001.

Fine, Adam, Website: "Players Network Gaming Guide Article—Big River", (http www playersnetwork com/travel/articles/big-river 001,005 html), download date: Jul. 25, 2001.

Grochowski, John, "Time is the newest name of the game", Chicago Sun-Times, Nov. 30, 2001, Section: Weekend Plus, News, Gaming, p. 21.

Website: "Blackjack—Odds and Strategy—The Wizard of Odds", (http //www thewizardofodds com/game/bj html), download date: Jul. 23, 2002.

Malmuth, Mason et al., Website: "Fundamentals of Video Poker Excerpt", Two Plus Two Publishing, (http www twoplustwo com/fvp html), download date: Jul. 23, 2002.

Website: "How to Play Video Poker—game rules, gambling tips, and strategies", (http //www casinobeat com/poker shtml), download date: Jul. 23, 2002.

Bueschel, Richard, "Lemons, Cherries and Bell-Fruit-Gum", Nov. 1995, Royal Bell Books, Denver, CO., First Edition, pp. 281-290.

Fey, Marshall, "Slot Machines A Pictorial History of the First 100 Years", Copyright 1997, Reno Nevada, Fifth Edition, pp. 76 and 77.

* cited by examiner

480

| PLAYER IDENTIFIER 482 | NAME 484 | FINANCIAL ACCOUNT IDENTIFIER 486 | HOME ADDRESS 488 | EMAIL ADDRESS 490 | DEMOGRAPHIC 492 |
|---|---|---|---|---|---|
| P111123 | SAM BROWN | 1111-1111-1111-1111 | ANYPLACE, USA | SBROWN@RAIN.COM | MALE, AGE 23 |
| P222234 | LINDA JONES | 2222-2222-2222-2222 | SOMEPLACE, USA | LJONES@SHINE.COM | FEMALE, AGE 47 |
| P333345 | MARGIE SMITH | 3333-3333-3333-3333 | ANYWHERE, USA | MARGIE@EAST.COM | FEMALE, AGE 65 |

| PREFERRED PLAY OPTION 494 | PREFERRED TARGET OUTCOME(S) 496 | HISTORICAL THEORETICAL WIN 498 |
|---|---|---|
| HIGHEST EXPECTED PAYOUT | A(h), K(h), Q(h), J(h), 10(h); "HIGH" HANDS | $2,345 |
| ALWAYS TAKE A SURE WIN; ALLOCATE 50% TO HOLDING A LONE ACE AND THE OTHER 50% TO DRAWING FIVE NEW CARDS | "LOW" HANDS; STRAIGHTS | $765 |
| ALWAYS DRAW ONE OR TWO CARDS TO A ROYAL-STRAIGHT-FLUSH | THREE-OF-A-KIND | $682 |

FIG. 4

500

| DRAW COMBINATION 502 | EXPECTED PAYOUT 510 |
|---|---|
| ROYAL-FLUSH | 800 |
| STRAIGHT-FLUSH | 50 |
| FOUR-OF-A-KIND | 25 |
| 4 CARDS TO A ROYAL-FLUSH | 18.70 |
| QUEEN-TEN SUITED | 0.48 |
| ACE | 0.47 |

FIG. 5

600

| SESSION IDENTIFIER: S1234 602 | | | | | |
|---|---|---|---|---|---|
| PLAYER IDENTIFIER: P777777 604 | | | | | |
| DATE: 09/24/2004 606 | | | | | |
| HANDLE PULL IDENTIFIER 608 | WAGER 610 | INTERMEDIATE OUTCOME 612 | DRAW COMBINATION 614 | TARGET OUTCOME(S) 620 | PAYOUT 622 |
| 1 | $1 | K(c) K(d) 6(d) 9(s) 10(h) | K(c) K(d) | ANY | 1 CREDIT |
| 2 | $1 | K(c) K(d) 5(c) 8(c) 2(h) | K(c) K(d) | 3-OF-A-KIND | NONE |
| 3 | $5 | K(c) 8(d) J(c) Q(h) 8(h) | 8(d) 8(h) | 3-OF-A-KIND | 50 CREDITS |
| 4 | $1 | Q(h) 8(d) 8(s) q(d) 10(h) | - | - | - |

FIG. 6

1200

| WINNING GAME OUTCOME | AWARD |
|---|---|
| JACKS OR BETTER | PAYS 1 COIN |
| TWO PAIR | PAYS 2 COINS |
| THREE-OF-A-KIND | PAYS 3 COINS |
| STRAIGHT | PAYS 4 COINS |
| FLUSH | PAYS 6 COINS |
| FULL HOUSE | PAYS 9 COINS |
| FOUR-OF-A-KIND | PAYS 25 COINS |
| STRAIGHT FLUSH | PAYS 50 COINS |
| ROYAL FLUSH | PAYS 800 COINS |

FIG. 12

1300

| WINNING GAME OUTCOME | AWARD |
|---|---|
| JACKS OR BETTER | PAYS 2 COINS |
| TWO PAIR | PAYS 2 COINS |
| THREE-OF-A-KIND | PAYS 2 COINS |
| STRAIGHT | PAYS 2 COINS |
| FLUSH | PAYS 50 COINS |
| FULL HOUSE | PAYS 2 COINS |
| FOUR-OF-A-KIND | PAYS 2 COINS |
| STRAIGHT FLUSH | PAYS 2 COINS |
| ROYAL FLUSH | PAYS 2 COINS |

FIG. 13

1400

| WINNING GAME OUTCOME | AWARD |
|---|---|
| THREE-OF-A-KIND | PAYS 3 COINS |
| STRAIGHT | PAYS 4 COINS |
| FLUSH | PAYS 6 COINS |
| FULL HOUSE | PAYS 9 COINS |
| FOUR-OF-A-KIND | PAYS 25 COINS |
| STRAIGHT FLUSH | PAYS 50 COINS |
| ROYAL FLUSH | PAYS 800 COINS |

FIG. 14

METHOD AND APPARATUS FOR PLAYING VIDEO POKER WITH A REDRAW FUNCTION

CROSS-REFERENCE TO RELATED APPLICATIONS

This application claims the benefit of priority of U.S. Provisional Patent Application Ser. No. 60/622,064 filed Oct. 25, 2004. The content of this application is incorporated by reference herein for all purposes.

This application is also related to co-pending U.S. patent application Ser. No. 11/251,468, filed Oct. 14, 2005; which claims the benefit of U.S. Provisional Patent Application Ser. No. 60/622,073, filed Oct. 25, 2004, the contents of each of which are incorporated by reference herein for all purposes.

FIELD OF THE INVENTION

The present invention relates to game playing apparatus and methods, and in particular to wagering games that provide a draw option that allows a player to replace selected indicia to increase the probability of producing a winning game outcome.

BACKGROUND OF THE INVENTION

Gaming has become an increasingly important industry in the United States and around the world. In games of chance, a player typically places a wager on one or more games, and receives a payout or loses his wager based on the outcome of the game and/or the wager. Examples of devices for games of chance include, without limitation, video poker gaming machines, mechanical slot machines, and video slot machines. These gaming devices use random numbers to develop game outcomes that can be probabilistically predetermined.

Several games require a player to make a decision or select an available option that may influence the final outcome of the game. Such games include, without limitation, poker, blackjack, pai gow poker, and casino war. For example, in a typical draw poker game, play begins when the player is dealt an initial five-card hand. The player then chooses which of the five cards to discard (or which of the five cards to hold). The chosen discards are replaced with new cards, and the resulting hand is then categorized as a winning or losing outcome. In blackjack, a player begins with a two-card hand, and then make decisions such as whether to hit, stand, double down, surrender, etc. In pai gow poker, a player begins with a seven-card hand and must decide how to split his initial hand of seven cards into a five-card hand and a two-card hand. In casino war, a player must periodically decide whether to go to war, or whether to surrender an initial bet.

These strategy games (also known as skill-based games) can be played on and video poker type gaming devices. These video poker gaming devices differ from slot-type gaming devices, allowing players to make selections that affect the probability of a winning game outcome. Much of the popularity of these skill-based games can be attributed to a players ability to implement their own strategy in an effort to improve the probability of obtaining a winning game outcome.

The most successful strategies, however, often do not result in a winning game outcome. Applicants have recognized that many players would like a second chance to successfully complete a winning game outcome.

BRIEF DESCRIPTION OF THE DRAWINGS

Various embodiments of the present invention are described herein with reference to the accompanying drawings. In the drawings, like reference numerals indicate identical or functionally similar elements. The leftmost digit(s) of a reference numeral typically identifies the figure in which the reference numeral first appears. As will be understood by those skilled in the art, the drawings and accompanying descriptions presented herein indicate some exemplary arrangements. Similarly, the illustrated entries represent exemplary information, but those skilled in the art will understand that the number and content of the entries can be different from those illustrated herein. A brief description of the drawings follows.

FIG. 4 is a table illustrating an example data structure of an example player database 208 as depicted in FIG. 1 for use in some embodiments of the present invention.

FIG. 5 is a table illustrating an example data structure of an example draw combination database 318 as depicted in FIG. 2 for use in some embodiments of the present invention.

FIG. 6 is a table illustrating an example data structure of an example session database 319 as depicted in FIG. 2 for use in some embodiments of the present invention.

FIG. 12 illustrates an example of a primary pay table.

FIG. 13 illustrates an example of a secondary pay table with modified award amounts.

FIG. 14 illustrates an example of a secondary pay table with modified winning game outcomes.

SUMMARY OF THE INVENTION

Figure 1:
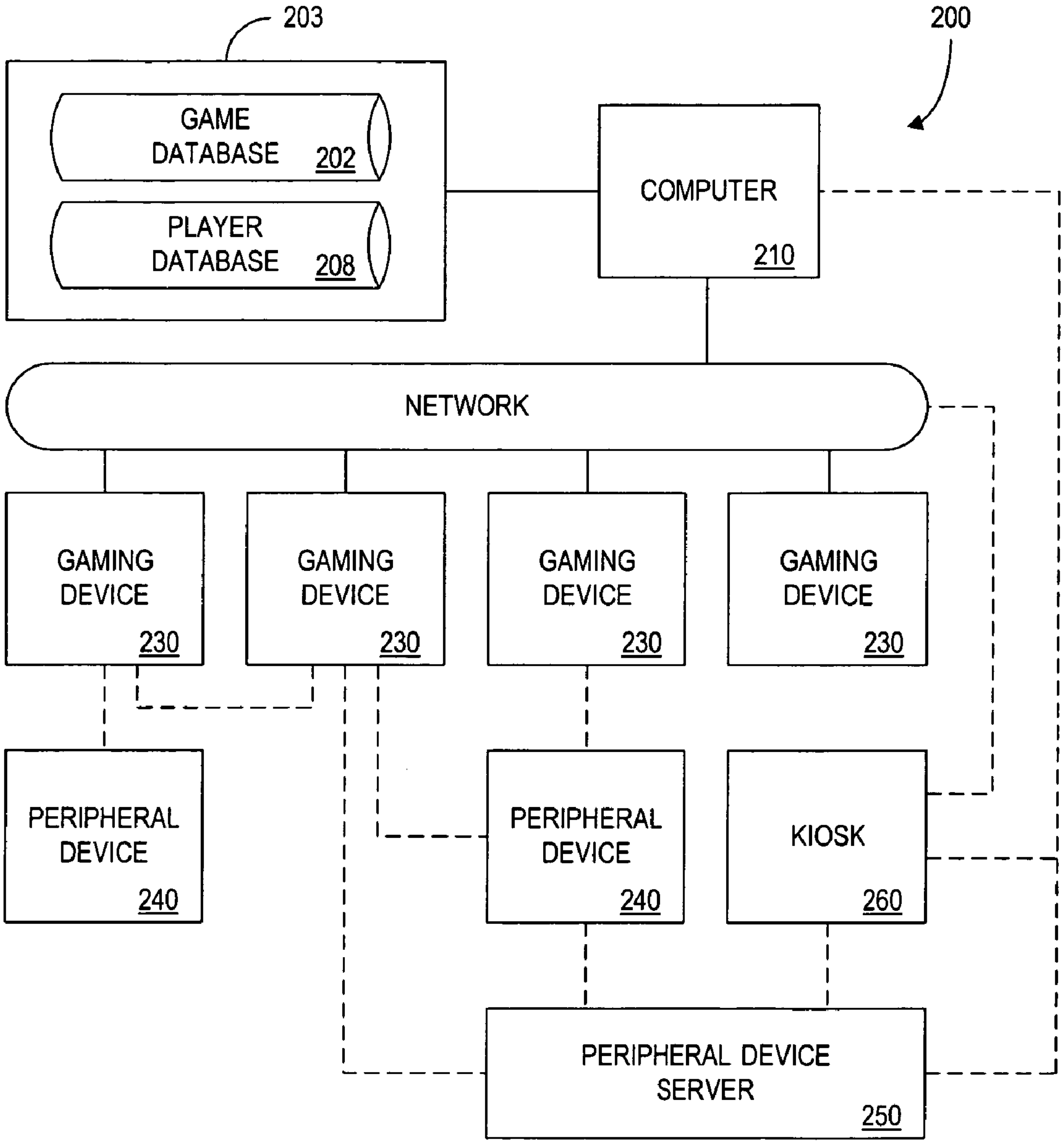
FIG. 1 is a block diagram of an example system, according to some embodiments of the present invention.

The limitations of the traditional video poker game, with its single opportunity to obtain a winning game outcome has been overcome. In one embodiment, a player has the opportunity to apply a strategy to each of a series of game outcomes in an effort to direct the game outcomes toward a winning game outcome.

In one embodiment, game play begins with a primary game. The primary game is associated with a primary pay table which determines a predetermined expected value for the game. An intermediate outcome is created in the primary game. A player may select a strategy that can be applied to the intermediate outcome in an attempt to achieve a winning game outcome in the primary game. Should the player fail to achieve a winning game outcome, or should the player decides to continue game play in an effort to obtain further winning game outcomes, a secondary game may be played in some embodiments. The secondary game starts with the indicia (e.g., cards) from the game outcome of the primary game. A plurality of secondary games may be played in an attempt to achieve a winning game outcome. Each secondary game is generated from the preceding game outcome, allowing the player to build towards a winning game outcome. The strategy selected (i.e., the cards held also known as the draw combination) and the replacement cards obtained determine the game outcome in the secondary game.

In one embodiment, each secondary game is associated with its own pay table to ensure that the predetermined expected value of the game is maintained. The pay tables associated with each secondary game may be termed secondary pay tables. These secondary pay tables may be modified based on their award amounts, the winning game outcomes eligible for awards, or modified for both award amounts and winning game outcomes. These secondary pay tables, in some embodiments, are generally modifications of the primary pay table.

The player may, in some embodiments, elect to pursue a plurality of secondary games in the game session until a winning game outcome is obtained or elect not to pursue further secondary games and instead, start a new game. In other embodiments, a gaming session may consist of a fixed number of secondary games before a new gaming session is initiated. Each new gaming session starts with a new intermediate outcome to break the chain of the continuation games.

One of the advantages, in some of the embodiments, of this game play mechanic is the ability to provide players with the potential for trying to improve on a losing hand or try for a better outcome on a winning hand. This provides a second chance to the player to either change their luck or increase their winnings.

Another advantage of this game play mechanic, in some embodiments, is providing the potential for a larger than normal payout. This is accomplished by limiting the pay tables associated with each of the strategies to the payment of a single award (e.g., the award associated with the target goal).

Another aspect of this game play mechanic, in some embodiments, is the ability of the player to select the volatility of the game play. Certain strategies, because they are long shots, will have a higher volatility. Lower volatility strategies will have a higher probability of occurring, but must be rewarded with a lower payout. By carefully selecting the strategy the player wishes to implement, the player can control the volatility of the game, and produce the game experience desired by the player.

Another aspect of one of the embodiments is the automatic determination and presentation of the best available strategies available in both the primary and secondary games. Each of the determined strategies is graphically presented to the player in the form of card hands allowing easy player comprehension. Furthermore, rather than selecting individual cards to form a card hand, the player is only required to make one selection (e.g., the card hand desired) to implement the intermediate card hand and proceed with game play. This lessens player fatigue, eliminates the tedium involved with the individual selection of cards, the incorrect selection of cards, and helps ensure that players recognize important strategic possibilities. All these factors increase the entertainment value of the game.

In some embodiments the game may also present statistical probabilities that are associated with each strategy to further simplify the selection of a particular strategy. This helps ensure that the player selects the game strategy that is most likely to provide a winning game outcome (e.g., either the game play that is most likely to provide any winning game outcome or that which provides the best expected value).

DETAILED DESCRIPTION OF THE INVENTION

Definitions

Numerous embodiments are described in this patent application, and are presented for illustrative purposes only. The described embodiments are not intended to be limiting in any sense. The invention is widely applicable to numerous embodiments, as is readily apparent from the disclosure herein. These embodiments are described in sufficient detail to enable those skilled in the art to practice the invention, and it is to be understood that other embodiments may be utilized and that structural, logical, software, electrical and other changes may be made without departing from the scope of the present invention. Accordingly, those skilled in the art will recognize that the present invention may be practiced with various modifications and alterations. Although particular features of the present invention may be described with reference to one or more particular embodiments or figures that form a part of the present disclosure, and in which are shown, by way of illustration, specific embodiments of the invention, it should be understood that such features are not limited to usage in the one or more particular embodiments or figures with reference to which they are described. The present disclosure is thus neither a literal description of all embodiments of the invention nor a listing of features of the invention that must be present in all embodiments.

The terms “an embodiment”, “embodiment”, “embodiments”, “the embodiment”, “the embodiments”, “an embodiment”, “some embodiments”, “an example embodiment”, “at least one embodiment”, “one or more embodiments” and “one embodiment” mean “one or more (but not necessarily all) embodiments of the present invention(s)” unless expressly specified otherwise.

The terms “including”, “comprising” and variations thereof mean “including but not limited to”, unless expressly specified otherwise.

The term “consisting of” and variations thereof mean “including and limited to”, unless expressly specified otherwise.

The enumerated listing of items does not imply that any or all of the items are mutually exclusive. The enumerated listing of items does not imply that any or all of the items are collectively exhaustive of anything, unless expressly specified otherwise. The enumerated listing of items does not imply that the items are ordered in any manner according to the order in which they are enumerated.

The terms “a”, “an” and “the” mean “one or more”, unless expressly specified otherwise.

The term “based on” means “based at least on”, unless expressly specified otherwise.

The methods described herein (regardless of whether they are referred to as methods, processes, algorithms, calculations, and the like) inherently include one or more steps. Therefore, all references to a “step” or “steps” of such a method have antecedent basis in the mere recitation of the term 'method' or a like term. Accordingly, any reference in a claim to a 'step' or 'steps' of a method is deemed to have sufficient antecedent basis.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices, which are not explicitly described as having such functionality/features. Thus, other embodiments of the present invention need not include the device itself.

Where databases are described, it will be understood by one of ordinary skill in the art that (i) alternative database structures to those described may be readily employed; (ii) other memory structures besides databases may be readily employed. Any schematic illustrations and accompanying descriptions of any sample databases presented herein are illustrative arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, other formats (including relational databases, object-based models and/or distributed databases) could be used to store and manipulate the data types described herein. Likewise, object methods or behaviors of a database can be used to implement the processes of the present invention. In addition, the databases may, in a known manner, be stored locally or remotely from a device that accesses data in such a database. With this understanding of these terms and structures, the present invention is described below.

Configuration of Typical Gaming Networks and Devices

The present invention may be configured to work in a computer network environment 200 as shown in FIG. 1. The computer network 200 of FIG. 1 includes a computer (or server) 210 (e.g., a casino server) that is in communication, via a communications network, with one or more devices, such as gaming devices 230 (e.g., slot machines, video poker machines), kiosks 260, casino personnel devices, merchant point-of-sale (POS) terminals, component devices (e.g., display screens), peripheral devices (e.g., card readers) etc. The server 210 may communicate with the devices (e.g., 230) directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® processor, that are adapted to communicate with the computer. Any number and type of devices may be in communication with the computer 210. Communication between the devices (i.e., gaming device 230, peripheral devices 240, kiosk 260, peripheral device server 250) and the server 210, and among the devices, may be direct or indirect, such as over the Internet through a Web site maintained by computer on a remote server or over an online data network including commercial online service providers, bulletin board systems and the like. In yet other embodiments, the devices may communicate with one another and/or the computer over RF, cable TV, satellite links, and the like.

Some, but not all, possible communication networks that may comprise the network or be otherwise part of the system include: a local area network (LAN), a wide area network (WAN), the Internet, a telephone line, a cable line, a radio channel, an optical communications line, and a satellite communications link. A variety of communications protocols may be part of the system, including but not limited to: Ethernet (or IEEE 802.3), SAP, SAS™, SuperSAS™, ATP, Bluetooth™, and TCP/IP. Further, in some embodiments, various communications protocols endorsed by the Gaming Standards Association of Fremont, Calif., may be utilized, such as (i) the Gaming Device Standard (GDS), which may facilitate communication between a gaming device and various component devices and/or peripheral devices (e.g., printers, bill acceptors, etc.), (ii) the Best of Breed (BOB) standard, which may facilitate communication between a gaming device and various servers related to play of one or more gaming devices (e.g., servers that assist in providing accounting, player tracking, ticket-in/ticket-out and progressive jackpot functionality), and/or (iii) the System-to-System (S2S) standard, which may facilitate communication between game-related servers and/or casino property management servers (e.g., a hotel server comprising one or more databases that store information about booking and reservations). Communication may be encrypted to ensure privacy and prevent fraud in any of a variety of ways well known in the art.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time. In one embodiment, a server computer may not be necessary and/or preferred. For example, the present invention may, in one or more embodiments, be practiced on a stand-alone gaming device 230 and/or a gaming device in communication only with one or more other gaming devices. In such an embodiment, any functions described as performed by the server 210 or data described as stored on the computer may instead be performed by or stored on one or more gaming devices 230.

The gaming device 230 may be implemented as a system server, a dedicated hardware circuit, an appropriately programmed general-purpose computer, or any other equivalent electronic, mechanical or electromechanical device. The gaming device 230 may comprise, for example, a slot machine, a video poker machine, a video blackjack machine, a video keno machine, a video lottery machine, a pachinko machine, or hardware for a table-top game. In various embodiments, a gaming device 230 may comprise, for example, a personal computer (e.g., which communicates with an online casino Web site), a telephone (e.g., to communicate with an automated sports book that provides gaming services), or a portable handheld gaming device (e.g., a device similar to a PDA). The gaming device 230 may comprise any or all of the gaming devices of the aforementioned systems. In some embodiments, a player device such as a PDA or cell phone may be used in place of, or in addition to, some or all of the gaming device components. For example, in some embodiments, a gaming device 230 may comprise a wireless handheld device similar to the Wifi Casino GS offered by Diamond I Technologies of Baton Rouge, Louisiana. Further, a gaming device 230 may comprise a personal computer or other device, which may be operable to communicate with an online casino and facilitate game play at the online casino. In one or more embodiments, the gaming device 230 may comprise a computing device operable to execute software that simulates play of a reeled slot machine game, video poker game, video blackjack game, video keno game, video roulette game, or lottery game.

In some embodiments (e.g., in an embodiment in which the server 210 manages downloadable games playable on one or more gaming devices 230), the server may store additional databases (e.g., in storage device 203). Examples of such additional databases include, but are not limited to, (i) a gaming device database that stores information related to one or more gaming devices with which the computer 210 is operable to communicate, (ii) a game database 202 that stores information regarding one or more games playable on and/or downloadable to one or more gaming devices 230, (iii) a scheduling and/or configuration database useful for determining which games are to be made available on which gaming devices, and (iv) a player database 208).

A player database 208 may be used to store historical data associated with specific players. A player database 208 may be used, for example, to store player wager data so that players wagering over a given threshold in a given amount of time may be rewarded for their patronage. The player database 208 may also contain other information that may be useful in, for example, promoting and managing player behaviors (e.g., information about the player's gaming preferences, gaming sessions, outstanding debts, lodging arrangements, and the like). Further, the player database 208 may store data regarding a given player's standing in a game session or bonus game, so that the player can continue the game session or bonus game at a plurality of gaming devices 230 that have common access to the player database 208. This can be accomplished by storing the player database 208 on a storage device 203 in communication with server 210.

In one embodiment, gaming device 230 may be operable to facilitate downloadable games such that games available for play on gaming devices may be stored on a server device (e.g., server 210 or another dedicated device) and downloaded to the gaming device. The server 210, for example, may have a storage device 203 for storing a game database 202, containing a plurality of individually selectable games that may be downloaded to the gaming device 230.

In addition, the server 210 may have additional databases for use in conjunction with modifying gaming devices 230. For example, in one embodiment, software components of the gaming device 230 may be remotely modified and/or updated by another device (e.g., server 210 or another device). For example, a payout or probability table stored in the memory of gaming device 230 may be altered, modified, or updated remotely, hot fixes may be applied to software stored by the gaming device 230. Similarly, in one embodiment server 210 may be operable to configure a gaming device 230 remotely.

The gaming device 230 may be programmed to retrieve any or all such updates from another device, as appropriate and preferred. Server 210 may be programmed to perform any or all of the above functions based on, for example, an occurrence of an event (e.g., a scheduled event), receiving an indication from a qualified casino employee and/or other person (e.g., a regulator) and/or receiving a request from a player.

Figure 2:
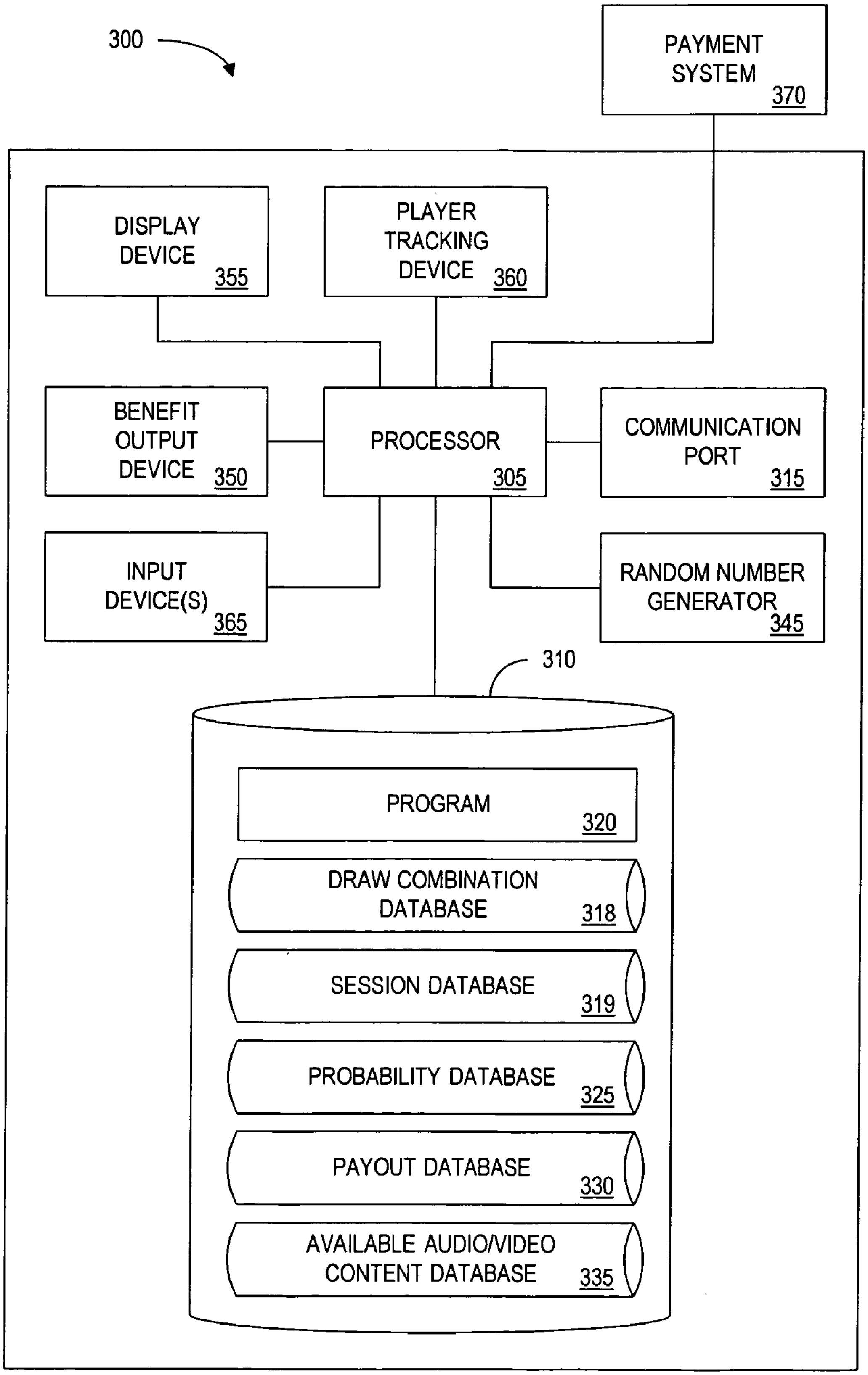
FIG. 2 is a block diagram of a typical gaming device.

A block diagram 300 of a gaming device 230 is illustrated in FIG. 2. The gaming device 230 comprises a processor 305 (such as one or more Intel® Pentium® processors) as shown in FIG. 2. The processor 305 of the gaming device 230 is operable to communicate with a random number generator 345 to create random game outcomes to the selection of random indicia. The random number generator 345, in accordance with at least one embodiment of the present invention, may generate data representing random or pseudo-random values (referred to as "random numbers" herein). The random number generator 345 may generate a random number, for example, every predetermined unit of time (e.g., every thousandth of a second) or in response to an initiation of a game on the gaming device 230. In the former embodiment, the generated random numbers may be used as they are generated (e.g., the random number generated at substantially the time of game initiation is used for that game) and/or stored for future use. A random number generated by the random number generator 345 may be used by the processor 305 to determine, for example, at least one of an outcome and payout. A random number generator 345, as used herein, may be embodied as a secondary processor, separate from but working in cooperation with the processor 305. Alternatively, the random number generator may be embodied as an algorithm, program component, or software program 320 stored in the memory of the gaming device 230 and used to generate a random number.

Note that, although the generation or obtainment of a random number is described herein as involving a random number generator 345 of a gaming device 230, other methods of determining a random number may be employed. For example, a gaming device owner or operator may obtain sets of random numbers that have been generated by another entity. HotBits™, for example, is a service that provides random numbers that have been generated by timing successive pairs of radioactive decays detected by a Geiger-Muller tube interfaced to a computer. A blower mechanism that uses physical balls with numbers thereon may be used to determine a random number by randomly selecting one of the balls and determining the number thereof.

As would be understood by one of ordinary skill in the art, a random number generator may be stored in a device other than a gaming device 230. For example, in some embodiments, a gaming device 230 may receive random numbers and/or any other data related to the random or pseudo-random determination of an outcome from a separate device, such as a server 210. It should be noted that such embodiments may be advantageous in environments or jurisdictions wherein the "central determination" of outcomes is required by regulation or otherwise preferred. Thus, for example, outcomes may be determined centrally by a server 210, and then propagated (e.g., electronically) such that indications of the outcomes may be viewed using one or more gaming devices 230 (e.g., "Class II" gaming devices, Video Lottery Terminals, and so on)

The processor 305 may also be operable to communicate (e.g., via a protocol such as GDS) with various component devices associated with the gaming device 230, including but not limited to player tracking devices 360, output devices (e.g., benefit output devices 350), input devices 365, display devices 355 and/or input/output devices.

In some embodiments, a benefit output device printer may be a component of gaming device 230. The benefit output device 350 may comprise one or more devices for outputting a benefit to a player of the gaming device 230. For example, in one embodiment the gaming device 230 may provide coins and/or tokens as a benefit. In such an embodiment the benefit output device 350 may comprise a hopper and hopper controller, for dispensing coins and/or tokens into a coin tray of the gaming device. In another example, the gaming device 230 may provide a receipt or other document on which there is printed an indication of one or more benefits (e.g., a cashless gaming ticket as it is known in the art). In such an embodiment, the benefit output device 350 may comprise a printing and document dispensing mechanism. In yet another example, the gaming device 230 may provide electronic credits as a benefit (which, e.g., may be subsequently converted to coins and/or tokens and dispensed from a hopper into a coin tray). In such an embodiment, the benefit output device 350 may comprise a credit meter and/or a processor that manages the amount of electronic credits indicated on a display of a credit meter balance.

In yet another example, the gaming device 230 may credit a monetary amount to a financial account associated with a player as a benefit provided to a player. The financial account may be, for example, a credit card account, a debit account, a charge account, a checking account, or a casino account (e.g., an account from which the player may access cashable and/or non-cashable funds using a player tracking card or smart card). In such an embodiment the benefit output device 350 may comprise a device for communicating with a server 210 on which the account is maintained.

Note that, in one or more embodiments, the gaming device 230 may include more than one benefit output device 350. For example, the gaming device 230 may include both a hopper and hopper controller combination and a credit meter balance. Such a gaming device 230 may be operable to provide more than one type of benefit to a player of the gaming device. A single benefit output device 350 may be operable to output more than one type of benefit. For example, a benefit output device 350 may be operable to increase the balance of credits in a credit meter and communicate with a remote device in order to increase the balance of a financial account associated with a player.

The processor 305 may also be operable to communicate with various output devices. In some embodiments, an output device comprises a display device 355. The display device 355 may comprise, for example, one or more display screens or areas for outputting information related to game play on the gaming device 230, such as a cathode ray tube (CRT) monitor, liquid crystal display (LCD) screen, or light-emitting diode (LED) screen. In one or more embodiments, a gaming device 230 may comprise more than one display device. For example, a gaming device 230 may comprise an LCD display for displaying electronic reels (or card hands in the case of a video poker gaming device) and a display area that displays rotating mechanical reels.

The display device 355 may comprise, for example, one or more display areas. For example, one of the display areas may display the outcome of a primary game played on the gaming device (e.g., video poker). Another of the display areas (e.g., a secondary game screen) may display rules for playing a game of the gaming device or the outcome of secondary games played in conjunction with the primary game. Yet another of the display areas may display the benefits obtainable by playing a game of the gaming device 230 (e.g., in the form of a payout table).

The processor 305 may also be in communication with one or more other output devices besides the display device 355, for outputting information (e.g., to a person or another device). Output devices may also be components of a gaming device 230. Output devices may comprise, for example, an audio speaker (e.g., for outputting an outcome or information related thereto, in addition to or in lieu of such information being output via a display device); headphones; an infra-red transmitter; a radio transmitter; an electric motor; a printer (e.g., such as for printing cashless gaming tickets); a dispenser for outputting pre-printed coupons, tickets or vouchers; an infra-red port (e.g., for communicating with a second gaming device or a portable device of a player); one or more universal serial bus (USB) ports; a Braille computer monitor; and a coin or bill dispenser. For gaming devices 230, common output devices include a cathode ray tube (CRT) monitor on a video poker machine, a bell on a gaming device (e.g., rings when a player wins), an LED display of a player's credit balance on a gaming device, an LCD display of a personal digital assistant (PDA) for displaying keno numbers.

The processor 305 may also be in communication with one or more input devices 365, which may be capable of receiving an input (e.g., from a player or another device) and which may be a component of gaming device 230. Alternately or additionally, an input device 365 may communicate with or be part of another device (e.g., a server 210, a gaming device 230, etc.). Some examples of input devices include: a barcode scanner, an optical scanner configured to read other indicia of a voucher or cashless gaming ticket, a CCD camera, a magnetic stripe reader (e.g., for reading data encoded upon a player tracking card), a smart card reader (e.g., for reading data stored upon a smart card), a computer keyboard or keypad, a button, a handle, a lever, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, an infrared port (e.g., for receiving communications from a second gaming device or from another device such as a smart card or PDA of a player), and a weight scale. For gaming devices 230, common input devices include a button or touch-screen on a video poker machine, a lever or handle connected to the gaming device, a magnetic stripe reader to read a player tracking card inserted into a gaming device, a touch -screen for input of player selections during game play, and a coin acceptor and bill acceptor.

The processor 305 may also be in communication with a payment system 370, which may be a component of the gaming device 230. The payment system 370 is a device capable of accepting payment from a player (e.g., a bet or initiation of a balance) and/or providing payment to a player (e.g., a payout). Payment is not limited to money, but may also include other types of consideration, including products, services, and alternate currencies. Exemplary methods of accepting payment by the payment system 370 include (i) receiving hard currency (e.g., coins or bills), and accordingly the payment system 370 may comprise a coin or bill acceptor; (ii) receiving an alternate currency (e.g., cashless gaming voucher, an electronic credit, a coupon, a non-negotiable token), and accordingly the payment system may comprise a bar code reader or other sensing means; (iii) receiving a payment identifier (e.g., a credit card number, a debit card number, a player tracking card number, a financial account identifier) and debiting the account identified by the payment identifier; and (iv) determining that a player has performed a value-added activity (e.g., participating in surveys, monitoring remote images for security purposes, referring friends to the casino).

In some embodiments, a gaming device 230 may comprise components capable of facilitating both input and output functions (i.e., input/output devices). In one example, a touch-sensitive display screen comprises an input/output device (e.g., the device outputs graphics and receives selections from players). In another example, a processor may communicate with a "ticket-in/ticket-out" device configured to dispense and receive cashless gaming tickets as is known in the art. Such a device may also assist in (e.g., provide data so as to facilitate) various accounting functions (e.g., ticket validation and redemption). For example, any or all of a gaming device, kiosk and casino personnel device maintained at a cashier cage may (i) comprise such a benefit input/output device, and/or (ii) communicate with a central server 210 that manages the accounting associated with such ticket-in/ticket-out transactions (e.g., so as to track the issuance, redemption and expiration of such vouchers). One example of such ticket-in/ticket-out technology, the EZ Pay™ system, is manufactured by International Gaming Technology, headquartered in Reno, Nev.

It should be appreciated that one or more embodiments may include storing graphic and/or sound elements that are used to construct a menu of options available for a player's selection via a touch-screen. These elements may be stored, for example, in EEPROM, flash memory, hard disk, CD-ROM, or in any other suitable storage device. The menu may be displayed via any suitable display device, such as a CRT, LCD, VFC, LED display. In one embodiment, the menu may be implemented using only dedicated electromechanical switches. In one embodiment, a player operates an input device 365 of the gaming device 230 to cause such a menu to be displayed. In one embodiment, a gaming device 230 includes a touch-screen and a touch-screen controller (not shown) associated with a video monitor display device. The touch-screen and touch-screen controller may be operable to communicate with a video controller of the video monitor display device and a processor 305 (e.g., the processor of gaming device). Thus, a player may be enabled to indicate decisions or choices by touching the touch-screen in the appropriate places.

In some embodiments, display of the menu of player options may preempt display of other information. For example, in one embodiment the game display device 355 or screen used to display game play indicia (e.g., the cards in a card hand displayed on a video poker type gaming device) during active game play may be used to provide a menu of available options. Typical options a player could select include game volatility and the designation of specific pay tables from which an award, if available, may be determined. Alternately, the player may be able to select various strategies for playing the game. In another embodiment, a dedicated display device or screen may be used to display a menu of available options on a continuous, periodic, or other basis.

Of course, as would be understood by one of ordinary skill in the art, a gaming device 230 may comprise various combinations of such component devices. For example, in one or more embodiments, the gaming device 230 may include more than one display device, one or more other output devices, several input devices, and so on (e.g., two display screens, two audio speakers, a ticket-in/ticket-out device and several buttons).

The processor 305 may also communicate with a memory 310 and a communications port 315 (e.g., to communicate with one or more other devices). The memory may comprise an appropriate combination of magnetic, optical and/or semiconductor memory, and may include, for example, Random Access Memory (RAM), Read-Only Memory (ROM), a compact disc and/or a hard disk. The memory 310 may comprise or include any type of computer-readable medium. The processor and the memory may each be, for example: (i) located entirely within a single computer or other device; or (ii) connected to each other by a remote communication medium, such as a serial port cable, telephone line or radio frequency transceiver. In one embodiment, the gaming device may comprise one or more devices that are connected to a remote server 210 for maintaining databases.

The memory 310 stores a program 320 for controlling the processor 305, as well as databases such as a draw combination database 318, session database 319, probability database 330 and available audio/video content database 335. The processor performs instructions of the program 320, and thereby operates in accordance with the present invention, and particularly in accordance with the methods described in detail herein. The program 320 may be stored in a compressed, un-compiled, and/or encrypted format. The program 320 furthermore includes program elements that may be necessary, such as an operating system, a database management system and "device drivers" for allowing the processor to interface with computer peripheral devices. Appropriate program elements are known to those skilled in the art, and need not be described in detail herein.

The term "computer-readable medium" as used herein refers to any medium that participates in providing instructions to the processor of the gaming device (or any other processor of a device described herein) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Transmission media include coaxial cables, copper wire, and fiber optics, including the wires that comprise a system bus coupled to the processor. Transmission media may carry acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over a telephone line using a modem. A modem local to a gaming device 230 (or, e.g., a server 210) can receive the data on the telephone line and use an infrared transmitter to convert the data to an infrared signal. An infrared detector can receive the data carried in the infrared signal and place the data on a system bus for the processor. The system bus carries the data to main memory, from which the processor retrieves and executes the instructions. The instructions received by main memory may optionally be stored in memory either before or after execution by the processor. In addition, instructions may be received via a communication port 315 as electrical, electromagnetic, or optical signals, which are exemplary forms of carrier waves that carry data streams representing various types of information. Thus, the gaming device may obtain instructions in the form of a carrier wave.

According to an embodiment of the present invention, the instructions of the program may be read into a main memory from another computer-readable medium; such from a ROM. Execution of sequences of instructions in the program causes the processor to perform the process steps described herein. In alternate embodiments, hard-wired circuitry may be used in place of, or in combination with, software instructions for implementation of the processes of the present invention. Thus, embodiments of the present invention are not limited to any specific combination of hardware and software. As discussed with respect to aforementioned systems, execution of sequences of the instructions in a program of a peripheral device 240 in communication with the gaming device 230 may also cause the processor 305 to perform some of the process steps described herein.

The memory may store one or more databases (e.g., probability database 325 and draw combination database 318) described herein. Some or all of the data stored in probability database 325 and draw combination database 318 is described. The described entries of the databases represent exemplary information only; those skilled in the art will understand that the number and content of the entries can be different from those illustrated herein. Further, despite any description of the databases as tables, an object-based model could be used to store and manipulate the data types of the present invention and likewise, object methods or behaviors can be used to implement the processes of the present invention.

Where appropriate, a prior art probability database 325 may be utilized in the performance of the inventive processes described herein. A probability database 325 and draw combination database 318 (or any such databases) may be stored in the data storage device in tabular form, or any other appropriate database form, as is well known in the art. The data stored therein may include a number of exemplary records or entries, each defining a random number.

Those skilled in the art will understand that the probability database 325 may include any number of entries. The tabular representation may also define fields for each of the entries or records. The fields may specify: (i) a random number (or range of random numbers) that may be generated by the random number generator 345; and (ii) an outcome that indicates the one or more indicia comprising the outcome that corresponds to the random number of a particular record.

A gaming device may utilize a probability database 325 to determine, for example, what outcome corresponds to a random number generated by a random number generator 345 and to display the determined outcome. The outcomes may comprise the cards randomly selected from a card deck to be displayed on the video display on a video poker gaming machine.

If desired, a second probability database may be used to determine the game outcome of a secondary game or bonus game that is commonly associated with the primary game of a gaming device. This second probability database could be constructed to make it more likely—albeit still random—to achieve a winning game outcome in the secondary game. Other arrangements of probability databases are possible. For example, the book "Winning at Slot Machines" by Jim Regan (Carol Publishing Group Edition, 1997) illustrates examples of payout and probability tables and how they may be derived. The entirety of this book is incorporated by reference herein for all purposes.

Further, where appropriate, a prior art payout database 330 may be utilized in the performance of the inventive processes described herein. A payout database 330 may be stored in the data storage device in tabular form, or any other appropriate database form, as is well known in the art. The data stored therein includes a number of example records or entries, each defining an outcome that may be obtained on a gaming device 230 that corresponds to a payout. Those skilled in the art will understand that the payout database 330 may include any number of entries. The tabular representation also defines fields for each of the entries or records. The fields specify: (i) an outcome, which indicates the one or more indicia comprising a given outcome; and (ii) a payout that corresponds to each respective outcome. The outcomes may be those obtained winning game outcomes typically obtainable on a video poker gaming machine (e.g., royal flush, straight flush, straight, four-of-a-kind, full house, two pair, three-of-a-kind, and pair).

In secondary games or bonus games that are typically associated with primary games, a secondary pay table may be constructed to determine the award for a winning game outcome in a secondary game. The secondary pay tables may be associated with specific game play strategies (i.e., draw combinations) that may be made available to a player in a secondary game. For example, a number of different payout databases, each database associated with a different strategy may be stored in a single payout database 330.

A gaming device 230 may use the payout database 330 to determine whether a payout should be output to a player because of an outcome obtained for a game. For example, after determining the outcome to output on the gaming device 230, the gaming device may access the payout database 330 to determine whether the outcome is a winning game outcome having a corresponding payout. If it is a winning game outcome, the gaming device 230 may provide the corresponding payout to the player. Other arrangements of payout databases 330 are possible. For example, the book "Winning at Slot Machines" by Jim Regan (Carol Publishing Group Edition, 1997) illustrates many examples of payout and probability tables and how they may be derived.

The gaming device 230 may also communicate with the server 210 and its associated storage device 203 to collect and store player tracking data. Such player data may be stored in a relational database and retrieved or otherwise accessed by the processor 305 after receiving a "key" data point from the player, such as a unique identifier read from the player's player tracking card or cashless gaming ticket.

Note that, although several common databases (i.e., player database 208, game database 202, etc.) may be described as being stored in a gaming device 230, in other embodiments of the present invention some or all of these databases may be partially or wholly stored in another device, such as one or more of the peripheral devices 240, the peripheral device server 250, central server 210 (or the storage device 203 in communication with the server 210), kiosks 260, casino personnel devices, merchant POS terminals, and so on. Further, some or all of the data described as being stored in the databases may be partially or wholly stored (in addition to or in lieu of being stored in the memory of the gaming device 230) in a memory of one or more other devices, such as one or more of the peripheral devices 240, another gaming device 230, the peripheral device server 250 and/or the server 210.

Any of the above (e.g., downloading of a game, updating of software, modification of a payout or probability table) may occur, for example, based upon an occurrence of an event (e.g., a scheduled event), an indication being received from qualified casino personnel or other personnel (e.g., a regulator), and/or upon a request from a player. In one embodiment, gaming device 230 may comprise a thin client device controlled be a server device (e.g., server 210 or another dedicated device such as the peripheral device server 250).

Figure 3:
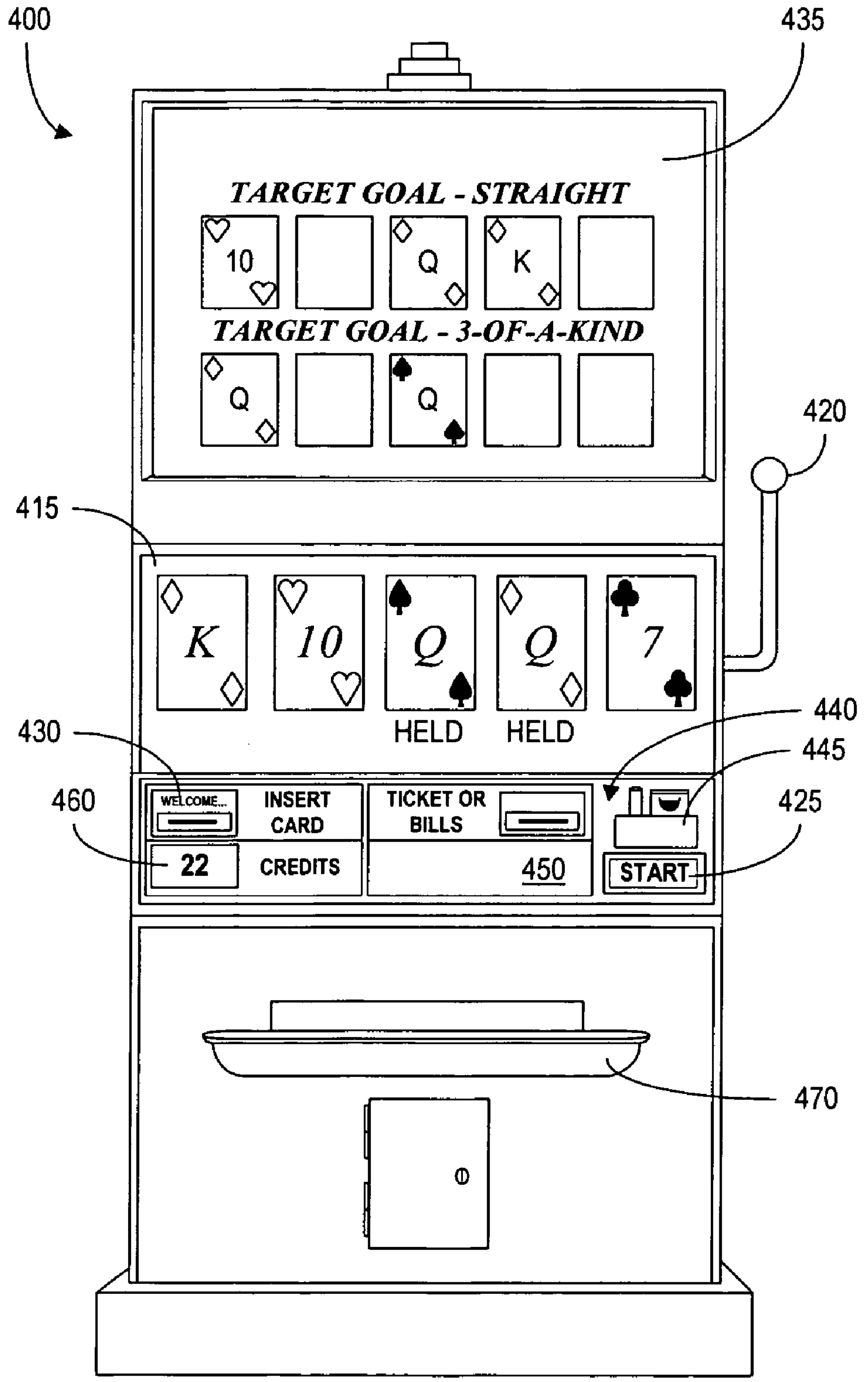
FIG. 3 is a typical video poker gaming device as depicted in FIG. 2 according to some embodiments of the present invention.

As discussed herein, in one or more embodiments the game device 230 may take the form of a video poker gaming machine 400 as shown in FIG. 3 and may be configured to operate in conjunction with the present invention.

FIG. 3 illustrates a typical video poker gaming machine 400, which includes a video display 415 and a secondary video display 435 for displaying the game. The video displays may have a touch-screen that enables the player to make selections by touching the appropriate position on the video display. The video displays may use any number of technologies including CRT, LCD, plasma display, and any other display technology.

In addition to using a touch-screen, the player may also make selections using a pushbutton panel. The pushbutton panel to allow the player to determine the amount wagered on each individual game as well as to make game selections. In addition, the pushbutton panel also typically includes a cash-out button that allows the player to end game play and receive any remaining credits shown on the credit meter.

A wager acceptor 440 is used to make a wager. The wager acceptor 440 may be either a coin acceptor 445 that accepts coins or a bill validator 450 that accepts paper currency (and in some cases ticket vouchers). Wagers placed on the gaming machine 400 are shown on the credit meter 460.

As noted above, the ticket voucher is used as a form of currency. The ticket voucher is generally a paper ticket printed by the gaming machine 400. Gaming machines 400 equipped with both a ticket printer and reader are generally known as cashless gaming machines. Cashless gaming machines are typically in communication with a central server to record all monetary transactions involving ticket vouchers. Each ticket voucher has a unique identification number that is associated with a monetary value in a database generally residing in a central server. When the ticket voucher is inserted into a gaming device's ticket reader, the identification number sent to the central server to recall the monetary value of the ticket. This monetary value is then added to the gaming machine's credit meter. This ticket voucher made be reinserted into any other cashless equipped gaming machine 400 to register an initial credit balance that may be wagered for game play. Cashless gaming machines 400 have become very popular with both players in gaming establishments, in eliminating the problematic coin handling required by standard gaming machines. Gaming machine 400 may also include hopper 470.

The pull handle 420 is provided to initiate game play. Most gaming machines 400 also incorporate a start button 425 in lieu of, or in addition to, the pull handle 420 to initiate game play.

In addition, a player-tracking device 430 may be offered that allows players to use their player-tracking card to accumulate loyalty awards. The player-tracking card is encoded with a unique player identification number that allows the gaming establishment to track individual gaming activity while machine 400 is in communication with a player-tracking server generally located in the gaming establishment. The player tracking card reader accepts the player-tracking card and indicates the player's identification number to the player-tracking server. The player-tracking server tracks the player's game play, allowing the gaming establishment to reward players with special loyalty awards dependent upon their wagering activity.

A more specific description of a gaming machine 400 suitable for use with the present invention follows.

Description of Illustrative Embodiments

According to some embodiments of the present invention, a player places an initial wager and receives an intermediate outcome. The outcome might be a poker hand, a blackjack hand, a pai gow hand, or some other outcome. The player then determines which cards to have replaced. In one embodiment, the gaming device may provide a number of possible strategies from which the player may select. These selectable strategies facilitate game play by both speeding the selection of cards and the player's recognition of various strategies.

In one embodiment, a first game outcome is determined by the strategy selected (e.g., draw combination) and replacement cards obtained in the intermediate outcome of the primary game. Strategies may be presented to the player prior to the player's selection of replacement cards. In cases where the player has improved the intermediate outcome in the game outcome, and the player has lost, there is incentive for the player to continue the game and pursue a winning game outcome (e.g., use the previous game outcome as an intermediate outcome of the subsequent game). In this case, the player may elect to provide an additional wager to continue game play from the first game outcome (i.e., the first game outcome becomes the second intermediate outcome) to generate a second game outcome.

Because the replacement cards from the first game have created a new, or second, intermediate outcome, the player may wish to change strategies. To assist the player in determining a strategy, the gaming device may select a number of potential strategies for the player. The gaming device determines and presents one or more strategies for the player to pursue. The player may then touch the screen of the gaming device to indicate one or more of these strategies.

The strategies may include for example, the most probable or highest expected value strategies available for the second intermediate card hand. The player may then select one of the strategies for continued play. Alternately, the player may customize their own game played by selecting their own strategy on a card-for-card basis.

In some embodiments, the selectable strategies may include player information that includes probability data, how the strategy is carried out (e.g., what poker cards to hold, what cards to use to create a two-card hand in pai gow poker), information about what game outcomes may result from an available strategy (e.g., what final poker hands could result), information about an expected return for an available strategy, and/or information about a payout that may result from an available strategy.

Some players also like to execute a desired strategy faster or more easily. For example, some players would like to be able to hold certain cards of an initial poker hand and receive a final hand, or to designate certain cards of an initial pai gow hand to a second hand, without identifying one or more of the cards individually. Thus, some players would find it appealing to be able to identify a desired option for play, such as by selecting an option represented on a display of a gaming device, and to have the gaming device facilitate the processing of any cards or other game symbols affected by the identified option or strategy. For example, the selectable strategies may incorporate a pushbutton or touch-screen icon associated with each strategy that enables the player to select one of the available strategies.

Applicants have also recognized that some types of players, when given the opportunity to pursue more than one option for play of a game from some intermediate outcome, and would like to be able to allocate a respective portion of an initial wager to each option or strategy they would like to pursue. For example, some players would like to be able to select a plurality of different strategies for a given intermediate outcome and allocate the same or different amounts of a wager to the different strategies.

Once the player has chosen one or more strategies, in some embodiments the player may designate wager amounts to allocate to one or more strategies. According to one embodiment, the player must distribute the amount of the original wager amongst all the strategies. For example, if a player has made an initial wager of $1, then $0.25 might go to a first strategy, and $0.75 to a second. The gaming device generates a second game outcome for each selected strategy. The player is then paid according to each outcome. In some embodiments, the payout amount corresponding to a particular game outcome is also based on how much of the initial wager was allocated to the strategy that resulted in that game outcome. Alternatively, the additional wager is applied only to a strategy selected by the player.

In the event that the player still has not won, additional wagers may be placed to continue play from the second game outcome. Once again, the gaming device or the player selects a strategy or strategies and attempts to obtain a winning game outcome. The second game outcome becomes the basis for determining these additional strategies (e.g., the strategy based on a game play mechanic such as replacing selected cards in games such as poker, i.e., a draw combination).

With these and other advantages and features of the invention that will become hereinafter apparent, the nature of the invention may be more clearly understood by reference to the following detailed description of the invention, to the appended claims, and to the several drawings included herein.

In the following description, reference is made to the accompanying drawings that form a part hereof, and in which is shown, by way of illustration, specific embodiments in which the invention may be practiced. These embodiments are described in sufficient detail to enable those skilled in the art to practice the invention. The exemplary embodiments described herein, however, should not to be taken in a limiting sense. It will be understood, for example, that other embodiments may be utilized, and that structural, logical, software, and electrical changes may be made without departing from the scope of the present invention.

1. Databases

Any databases noted above are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides those suggested by the tables shown. For example, those skilled in the art will understand that the number and/or content of the databases can be different from those illustrated herein. The exemplary information of two or more described databases alternatively may be included in one database. Further, the exemplary information of one described database alternatively may be included in more than one database. Similarly, the illustrated entries of the databases represent exemplary information only; those skilled in the art will understand that the number and/or content of the entries can be different from those illustrated herein. Based on the present disclosure many other arrangements of data will be readily understood by those of skill in the art. Further, despite the exemplary depiction of the databases as tables, it will be understood that an object-based model could be used to store and manipulate various data types of the present invention, and appropriate object methods or behaviors could be used to implement various processes of the present invention.

1.1. Player Database

FIG. 4 is a tabular representation 480 of the player database 208 of FIG. 1. The tabular representation 480 of the player database 208 includes a number of example records or entries, each indicating a player. Those skilled in the art will understand that the player database 208 may include any number of entries. The tabular representation 480 also defines fields for each of the entries or records. The fields specify: (i) a player identifier 482 that uniquely identifies the player, such as a player tracking card number; (ii) a player name 484; (iii) a financial account identifier 486 of the player, which may represent, for example, a credit card account, a debit card account and other financial accounts; (iv) a home address 488 of the player; (v) an email address 490 of the player; (vi) a demographic 492 of the player, which may indicate, for example, the gender, age, residence, income and/or occupation of the player; (vii) a preferred play option 494 of the player, which provides an indication of one or more options for play, instructions, draw combinations, and/or strategies, which the player prefers to use during play of a game, and which may or may not be based on or associated with a primary, intermediate, or initial outcome; (viii) preferred target outcome(s) 496 of the player, which provides an indication of one or more outcomes (or one or more sets of outcomes) that the player prefers to achieve; and (ix) a historical theoretical win 498 of the player, based on, for example, the number and types of games the player has played.

Not all of the fields depicted in FIG. 4 are required, and various substitutions, deletions and other changes to the tabular representation will be readily apparent to those of ordinary skill in the art. For example, the preferred target outcome is not needed in many embodiments. The depicted fields, for example, the demographic information, are for illustration only. Various other forms of demographic information are described herein and still others will be readily apparent to those of skill in the art.

1.2. Draw Combination Database

FIG. 5 is a tabular representation 500 of the draw combination database 318 of FIG. 3. The tabular representation 500 of the draw combination database 318 includes entries indicating information about exemplary expected payouts that are associated with exemplary draw combinations, such as for a video poker game. Those skilled in the art will understand that the draw combination database 318 may include any number of entries. The tabular representation 500 also defines fields for the entries or records. The fields specify: (i) a draw combination 502 that includes a representation of a set of one or more cards of a hand to be held; and (ii) an expected payout 510 that includes a representation of a payout that the player could theoretically expect if the draw combination 502 is used.

Not all of the fields depicted in FIG. 5 are required, and various substitutions, deletions and other changes to the tabular representation will be readily apparent to those of ordinary skill in the art. The depicted fields, for example the primary, target, and current outcomes, are for illustration only. Various other types and/or representations of outcomes are described herein and still others will be readily apparent to those of skill in the art.

Some of the representations of the draw combinations 502 are depicted in FIG. 5 in terms of a general category of a set of one or more card combinations (e.g., "ACE"). Draw combinations may alternatively be represented as specific sets of cards. For example, all of the "ACE" draw combinations could be represented individually with one or more entries of "ACE OF HEARTS," "ACE OF DIAMONDS," "ACE OF SPADES," and "ACE OF CLUBS." Similarly, the specific cards that comprise the one or more combinations could indicate one or more combinations of "4 CARDS TO A ROYAL-FLUSH".

Although the draw combinations 502 depicted in FIG. 5 as defining a set of one or more cards to be held (e.g., in an initial hand of cards), it will be understood that a draw combination may alternatively refer to a set of cards to be discarded. In some embodiments, a draw combination may refer to both a set of cards to be held and a set of cards to be discarded. Also, draw combinations need not indicate a specific rank (e.g., "ACE") or suit (e.g., "HEART") of a card. In some embodiments, for example, a draw combination may refer to a card by its position (e.g., in a displayed hand, in a generated deck, in an order dealt).

The representation of the values for expected payout amounts 510 are depicted in FIG. 5 in terms of a number of coins. Payout amounts may alternatively be represented as a variable 'X', or a formula involving one or more such variables, as well as other constants are elements. In other words, in some embodiments, the ratio of values for any two payout amounts may be a constant. Many other representations are possible. For example, the expected payout 510 may include for each respective payout a wager amount (or credit amount, etc.).

1.3. Session Database

FIG. 6 is a tabular representation 600 of the session database 319 of FIG. 2. The tabular representation 600 of the session database 319 includes an example record or entry indicating information about an exemplary gaming session of a player. Those skilled in the art will understand that the session database 319 may include any number of entries. The tabular representation 600 also defines fields for the entries or records. The fields specify: (i) a session identifier 602 that uniquely identifies a session; (ii) a player identifier 604 that uniquely identifies a player; (iii) a date 606 that includes a representation of a date and/or time that is associated with the session; (iv) a handle pull identifier 608 that uniquely identifies a handle pull or game of the session; (v) a wager 610 that includes a representation of an amount the player has wagered on the handle pull; (vi) an intermediate outcome 612 that includes a representation of an intermediate outcome associated with the handle pull, such as an initial hand of cards or an initial set of game symbols; (vii) a draw combination 614 that includes a representation of any game symbols, such as cards, to be held and/or discarded in determining a first final outcome; (viii) a first final game outcome; (ix) a target outcome 620 (e.g., Royal flush, flush) of one or more outcomes (or one or more sets of outcomes) that the player prefers to achieve); and (xiv) a wager payout 622 that includes the winning payout amounts for any winning game outcomes. The second and subsequent handle pulls represent secondary games in successive order. The intermediate outcome 612 is the game outcome from the previous handle pull identifier 608. The draw combination 614 will generally change because of changes in game play strategies because of the previous game outcome.

A handle pull may correspond to a single play or game at a gaming device. In some embodiments, a handle pull may refer to play related to a single wager. For example, in video poker, a player might play a single game in which a single initial hand is used to determine two final hands (which may or may not require an additional wager). This single game may be considered to include either one or two handle pulls. In some embodiments, a handle pull may refer to a single complete game (e.g., including one or more hands, decisions, or plays) related to one or more wagers. For example, in video blackjack, a player might play a single game in which he splits a pair of sevens, requiring an additional wager. This single game may be considered to include either one or two handle pulls.

Alternatively, a single game may include multiple handle pulls and/or multiple rounds of wagering before the game is completed. For example, in one embodiment, the present invention may allow (or require) a single wager that entitles the player to three game outcomes. Consequently, the player has an opportunity to better the resulting game play of the first game outcome in both the second and third game outcomes.

The first intermediate outcome 612 may be any outcome generated by or transmitted among any or all of gaming devices 230 or server 210. A first intermediate outcome typically is a primary or initial outcome during play of a game that may affect the first game outcome (and all subsequent game outcomes) of the play of the game. For example, an intermediate outcome (whether it be the first second or third) may not conclusively determine the payout or prize to be awarded the player—such as where the player has to make a decision before the game outcome is determined, or where the play of the game is still subject to an element of chance. Examples include (but are not limited to):

- An initial five-card hand dealt to a user, before the player selects replacement cards in video poker
- An entry into a bonus round in a reel-slot game
- An initial two-card blackjack hand dealt to a user, before the player has made further decisions
- A blackjack hand, after the player has made at least one decision (e.g., hit), but while the player still has opportunity for further decisions (e.g., additional hits, splits)
- A seven-card pai gow poker hand dealt to a user, before the player has decided how to split the hand into separate five-card and two-card hands A stack of four tiles in pai gow, before the player has decided how to split the tiles into two hands A war in the game of casino war, before the player has decided whether to surrender half his bet or to add to his initial bet and go to war Not all of the fields depicted in FIG. 6 are required, and various substitutions, deletions and other changes to the tabular representation will be readily apparent to those of ordinary skill in the art. For example, the target outcome 620 is not needed in many embodiments. As another example, neither the player identifier 604 nor the date 606 is needed in many embodiments. The depicted fields, for example, the draw combinations and intermediate outcome, are for illustration only. Various other types and/or representations of outcomes and draw combinations are described herein and still others will be readily apparent to those of skill in the art.

2. Processes

The system discussed herein, including the exemplary hardware components and the databases are useful to perform the methods of the invention. It should be understood, however, that not all of the above-described components and databases are necessary to perform any of the present invention's methods. In fact, in some embodiments, none of the above-described system is required to practice the invention's methods. Thus, the player database 208 described above is useful for tracking users and information about them, but it is not absolutely necessary to have such a database in order to perform the methods of the invention. For example, the methods described below may be practiced using a conventional player-tracking list in conjunction with a casino's conventional accounting system.

Figure 7A:
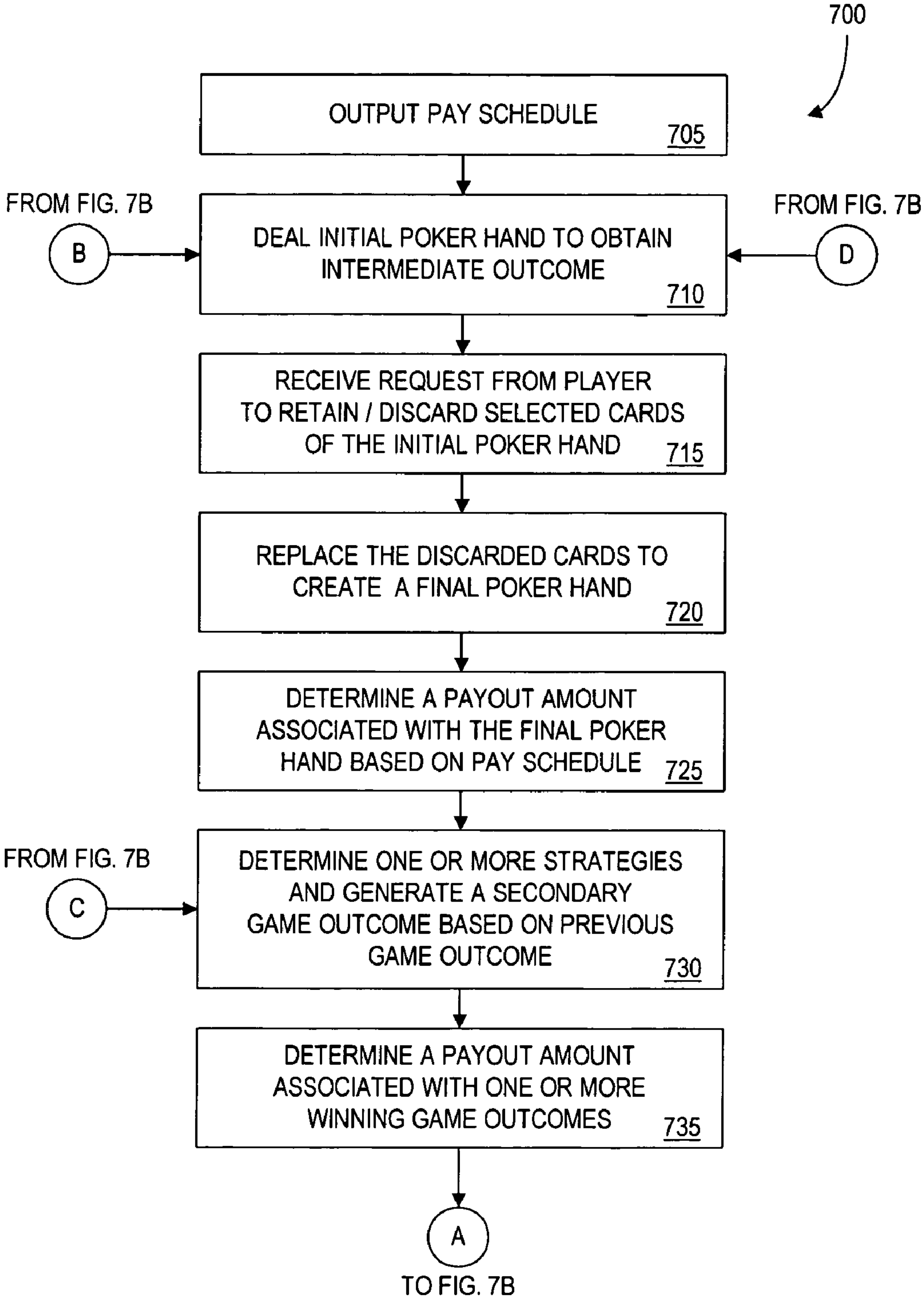
FIGS 7A and 7B depict a flow diagram illustrating an exemplary process for facilitating continuing game play for use in some embodiments of the present invention.
Figure 7B:
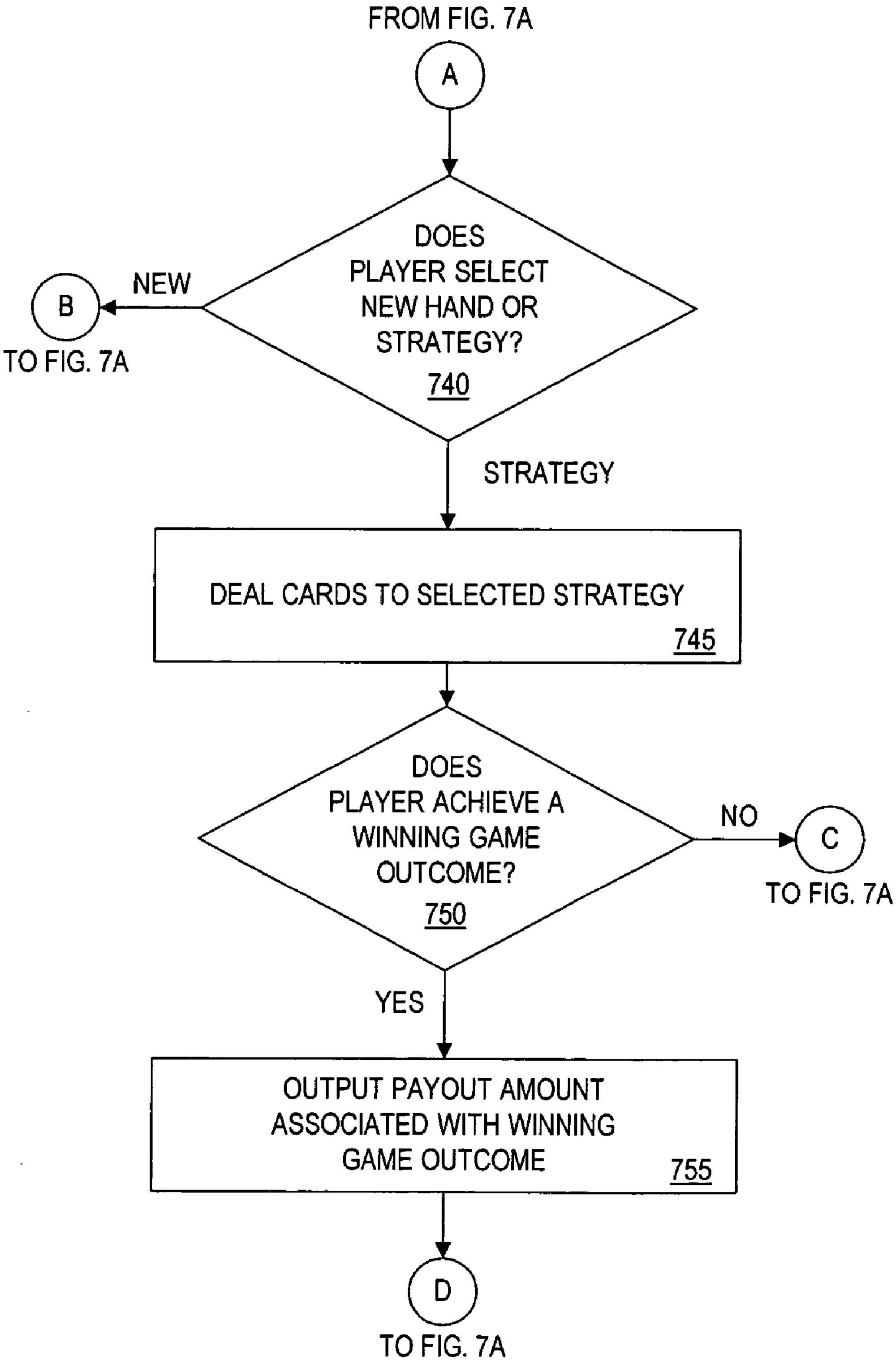

Referring to FIG. 7, a flow chart 700 represents some embodiments of the present invention that may be performed by a server, such as a casino server or a Web server, a casino representative, such as a dealer at a table game, and/or by a gaming device including, without limitation, a video blackjack machine and a video poker machine. The particular arrangement of elements in the flow chart of FIG. 7 is not meant to imply a fixed order to the steps; the steps can be practiced in any order, sequence, and/or timing that is practicable for various embodiments of the present invention.

Following is a description of the process steps to be performed by (i) a gaming device, (ii) a controller, (iii) devices operatively connected to gaming devices and/or controllers (e.g., retrofitted hardware devices), and (iv) any combination thereof. Thus, although the following description discusses the steps as performed by a gaming device, it is contemplated that the steps may be performed by any combination of the devices and computers described herein. Additionally, it should be understood that the steps of the invention may be performed in any order, and thus are not limited to the order in which they are described.

To start play of a wagering game, an initial wager is made. A handle pull starts the flow process described below and illustrated in FIG. 7.

Step 705: Output a Pay table

A pay table may be output in a manner known in the art. For example, a pay table may comprise fixed payout amounts based on achieving particular outcomes, consistent with a payout database. For example, a payout of 10,000 credits may be associated with the outcome "royal flush", and such information may be output by a gaming device display screen.

In some embodiments, the gaming device determines the payout for a winning outcome by searching an internal database (i.e., a pay table) in which payouts are stored as a function of outcome and wager size. For example, if the player has allocated fifty cents to a strategy that has resulted in the outcome of a straight, then the gaming device looks up the payout corresponding to a straight and a fifty-cent wager. In some embodiments, payout amounts may be based not only on a wager amount placed and final outcome achieved, but also on a draw combination utilized to achieve a final outcome.

In some embodiments, the pay table is represented internally as a function of the wager size. For instance, the payout for a straight may be four times the wager size. Accordingly, to determine the payout for a straight with a fifty-cent wager, the processor of the gaming device multiplies fifty cents by four to get $2.00.

Other ways of determining the payout are possible and will be well known to those of ordinary skill in the art. In some embodiments, payouts may be rounded to the nearest whole cent, nearest denomination of ten cents, nearest token denomination, etc.

In some embodiments, a primary pay table may be associated with outcomes achieved during primary play of a video poker game. For example, a primary pay table may indicate payout amounts associated with each of the winning outcomes a player may achieve in a primary game outcome in a video poker hand, but not necessarily with the secondary games—which are continuation games successively generated in a chain from the primary game. In some embodiments, each secondary game may have a secondary pay table from which winning game outcomes are awarded. This secondary pay table may be generated, in some embodiments, based on the expected value of the strategy employed in the secondary game (i.e., payout amounts associated with secondary game outcomes may be based on associated draw combinations). The secondary pay tables may also be predetermined and stored in a database for use as required.

Step 710: Deal an Initial Video Poker Hand (Intermediate Outcome)

To determine an intermediate outcome, the processor of a gaming device 230 may execute a routine to generate one or more random numbers, and may then associate these numbers with particular game symbols. For instance, in some video poker embodiments, the processor of a gaming device will generate fifty-two random numbers, each number representing the position of a predetermined corresponding card in a shuffled electronic deck. In such embodiments, the intermediate outcome is the first five cards in the deck.

In a table game example, an intermediate outcome may be generated by a dealer. The dealer may, for instance, shuffle cards and then deal a hand to a blackjack player and a hand to the house. In some embodiments of the present invention, a server generates an intermediate outcome and transmits an indication of the intermediate outcome to a gaming device. In other embodiments, a gaming device may be preloaded with one or more intermediate outcomes, and may use the stored intermediate outcomes in a predetermined order or in a random or pseudo-random sequence. Many other methods for determining intermediate outcomes are possible.

For example, as is known in the art, a player of a video poker machine may be provided with an intermediate outcome (e.g., a 5-card hand) after establishing a credit balance and actuating a "draw" button. For example, a player may achieve a first intermediate outcome of "K♣K♦ 6♦ 9♠10♥".

Step 715: Receive a Request from a Player to Retain/Discard a Number of Identified Cards of the Intermediate Outcome Accordingly, as is known in the art, a player may identify a number of cards that are to be held (e.g., by pressing a "hold"

button underneath the desired cards). For example, after being dealt "K♣K♦ 6♦ 9♠ 10♥" the player may elect to hold the "K♣K♦."

Step 720: Replace the Discarded Cards to Create a Primary Game Outcome

A player may then be dealt replacement cards for any cards the player chose to discard. For example, after discarding the "6♦ 9♠ 10♥,", the player may be dealt three new cards, such that the player achieves a final poker hand of "K♣K♦ 5♣8♣ 2♥".

Step 725: Determine a Payout Amount Associated With the Primary Game Outcome Based on the Pay Table In some embodiments, a payout amount may be determined in association with the final poker hand achieved during step 720. For example, if a player achieves "K♣K♦ 5♣ 8♣2♥" during step 720, the player may achieve a payout indicated by a pay table for achieving a pair of kings (e.g., 5 coins for achieving jacks or better). In some embodiments, the determined payout amount may then be output to the player during step 730, via any benefit output device described herein (e.g., the player's credit balance meter increases by 5 credits).

Step 730: Determine One or More Strategies Based on the Previous Game Outcome In some embodiments, step 730 may comprise determining one or more strategies (e.g., draw combinations) and one or more target secondary game outcomes based on a final video poker hand achieved during step 720.

For example, in step 720, a player may have achieved a final poker hand of "K♣K♦ 5♣8♣2♥." Accordingly, based on the final poker hand achieved during step 720, step 730 may comprise determining one or more strategies in association with the final poker hand.

In some embodiments, a strategy may comprise a number of cards from a previously achieved poker hand (e.g., a final poker hand achieved during step 720, a final hand achieved during step 750). For example, if the player achieves during step 720 a final poker hand of "K♣K♦ 5♣8♣2♥," any of the cards from the hand may be used to create a strategy towards a secondary game outcome. In a preferred embodiment comprising five-card poker hands, strategies comprise less than five cards. Thus, continuing with the above example, one acceptable strategy option may be "K♣K♦ _ _ _" (hyphens indicating blank spaces into which cards may be drawn to create a final hand).

In some embodiments, strategies may be constructed in a manner such that players may receive a greater probability of achieving one or more winning outcomes with the strategies than if they were to draw a full hand using completely new cards. For example, if a player is allowed to start with three cards to a flush (e.g., "8♥ 10♥ 4♥ _ _"), the player may be more likely to attain a flush than if the player were to draw five cards from scratch in an attempt to draw a flush.

Any number of strategies may be constructed in association with a previously achieved poker hand. For example, for each previously achieved poker hand, a player may receive (or create) a number of potential strategies. Referencing the above example, if a player achieves a final poker hand of "K♣K♦5♣8♣2♥" in step 720, the player may elect to start with either "K♣_ _ _ _," "K♣K♦ _ _ _" or "K♣5♣8♣_ _."

Drawing to a strategy yields a game outcome (e.g., if a strategy is to hold "K♣K♦ _ _ _," three more cards are dealt such that a 5-card hand is completed). In some embodiments, only various types of game outcomes may be considered satisfactory winning game outcomes (i.e., game outcomes that yield an indicated payout amount). For example, if a strategy is "K♣ K♦ _ _ _," a game outcome may only be satisfactory if it is a 3-of-a-kind or 4-of-a-kind (e.g., a "K♣ K♦ K♠ any any," "K♣K♦ K♥ any any," or "K♣K♦ K♥ K♠ any"). Thus, step 730 may comprise determining one or more satisfactory game outcomes in association with a strategy.

As stated, a payout amount may then be determined in association with a winning game outcome, as will be described in step 735.

Step 735: Determine a Payout Amount Associated With One or More Secondary Game Outcomes An award associated with a game outcome may be based on the probability that one or more winning game outcomes are achieved in light of an associated strategy. For example, if a player is able to construct a strategy of "K♣J♣_ _ _," the payout amount associated with achieving a royal flush may be less than a payout amount associated with achieving a royal flush if the player is only able to construct a strategy of "K♣_ _ _ _" (a strategy that is far less likely to produce a royal flush). A determined payout amount may further be based on a payout amount associated with a particular outcome as indicated by the pay table of step 705.

For example, if according to a pay table of step 705 an outcome of royal flush pays 5,000 coins if achieved during step 720, an outcome of royal flush may pay some greater or lesser function of 5,000 coins if achieved as a winning game outcome, depending on the strategy employed. For example, an algorithm may indicate that a player may receive a larger amount of coins (e.g., 50,000) for hitting a royal flush if the strategy employed is "K♣_ _ _ _," because, as opposed to standard draw video poker play (e.g., wherein the player would draw five fresh cards, with an option to hold and re-draw), by selecting a strategy option (i) the player may have a reduced probability of achieving a royal flush (e.g., the player is essentially being dealt a stud-draw for the remaining four cards in the hand and may not re-draw without wagering once more), and (ii) a greater amount of coins may be awarded for achieving a winning game outcome, as only certain types of outcomes yield payout amounts (e.g., because they player would not be paid for an outcome of "K♣ K♥ K♠ any any," it becomes affordable for a casino or slot manager to offer a larger payout for the royal flush).

Accordingly, as described previously, a number of strategy options may be output to a player. At least one payout amount for a winning game outcome and a wager amount may be associated with each strategy option. For example, a strategy option of "K♣_ _ _ _" may comprise a payout amount (e.g., 50,000 coins), a winning game outcome (e.g., a royal flush) and a wager amount (e.g., one coin). Thus, it should be noted that one advantage of the present invention lies in the provision of large jackpot amounts with relatively low associated wagers.

Step 740: Receive a Player Selection to Receive an Additional Secondary Game or New Primary Game In step 740, a player may be presented with an opportunity to select a strategy option or receive a new primary hand (e.g., revert to step 710). In some embodiments, a player must pay a first indicated wager amount (e.g., 1 coin) to play an additional secondary game, or pay a second indicated wager amount (e.g., 2 coins) to receive a new primary game. In other embodiments, wager amounts associated with each choice may be constant. Such choices may be output by any appropriate output device (e.g., a touch-sensitive LCD screen), and the selections thereof may be received by any appropriate input devices (e.g., the player selects a particular strategy using the LCD screen). For example, a player may select the strategy of playing "K♣____," and a wager amount may be deducted from his credit balance.

Step 745 Deal Cards to the Selected Strategy

If the player chooses a strategy, cards are then dealt to the hand such that it may be completed (e.g., the player's strategy comprises one card and a game outcome must comprise five cards, four additional cards are dealt). For example, if a player's strategy is "K♣____," four cards may be dealt, such that g the game outcome is "K♣ 8♦J♣ Q♥8♥."

Step 750 Determine Whether the Player Has Achieved a Winning Game Outcome

The gaming device and/or controller may then determine whether the player has achieved a winning game outcome. In one embodiment, a relational database accessible to a gaming device and/or controller may store a number of winning game outcomes in association with a strategy selected during step 740. For example, if the player selects "K♣_ _ _ _" during step 740, only one winning game outcome may be associated with the strategy selected (e.g., a royal flush in clubs, "A♣ K♣ Q♣ J♣ 10♣" Accordingly, in some embodiments, if a winning game outcome as been achieved, the payout amount determined during step 735 may be output and play may revert to step 710. If not (e.g., the player achieves another game outcome, such as "K♣ 8♦ J♣ Q♥ 8♥"), the process may revert to step 730, wherein one or more strategies, winning game outcomes, payout amounts and wager amounts may be determined in association with the poker hand achieved during step 750 (e.g., the "unsatisfactory" game outcome of "K♣ 8♦ J♣ Q♥ 8♥"). In this manner, the process may continue, and a player may "build upon" a poker hand (e.g., build toward a royal flush) by successively electing to hold various cards, though the payout amounts associated with achieving various outcomes may then in some embodiments decrease accordingly.

Step 755: Output Payout Amount Associated with Winning Game Outcome

In the descriptions that follow, each of the steps outlined above will be discussed in detail. Note that not all of these steps are required to perform the method of the present invention. Further, additional and/or alternative steps for performing are also discussed below. For example, in some embodiments many additional steps may be added to update and maintain the databases described above, but as indicated, it is not necessary to use the above described databases in all embodiments of the invention. Also, note that the above general steps represent features of only some of the embodiments of the present invention. Steps of any of the various processes described herein may be combined and/or subdivided in any number of different ways so that the method includes more or fewer actual steps. Some alternative combinations and/or subdivisions of steps are described herein, and others will be apparent to those of ordinary skill in the art. In other words, methods of the present invention may contain any number of steps practicable to implement any or all of the processes described herein. The above process is exemplified by the following example.

Example Embodiments

The following is an example according to some embodiments of the present invention. A player may approach a gaming device 230, such as shown in FIG. 3 and establish a balance of credits (e.g., by inserting a cashless gaming ticket, paper currency, or coin) on the credit meter 460. The player may bet one credit, initiate game played by activating the start button 425, and receive a randomly generated initial hand (also known as an intermediate outcome) 810 as shown in FIG. 8.

Figure 8:
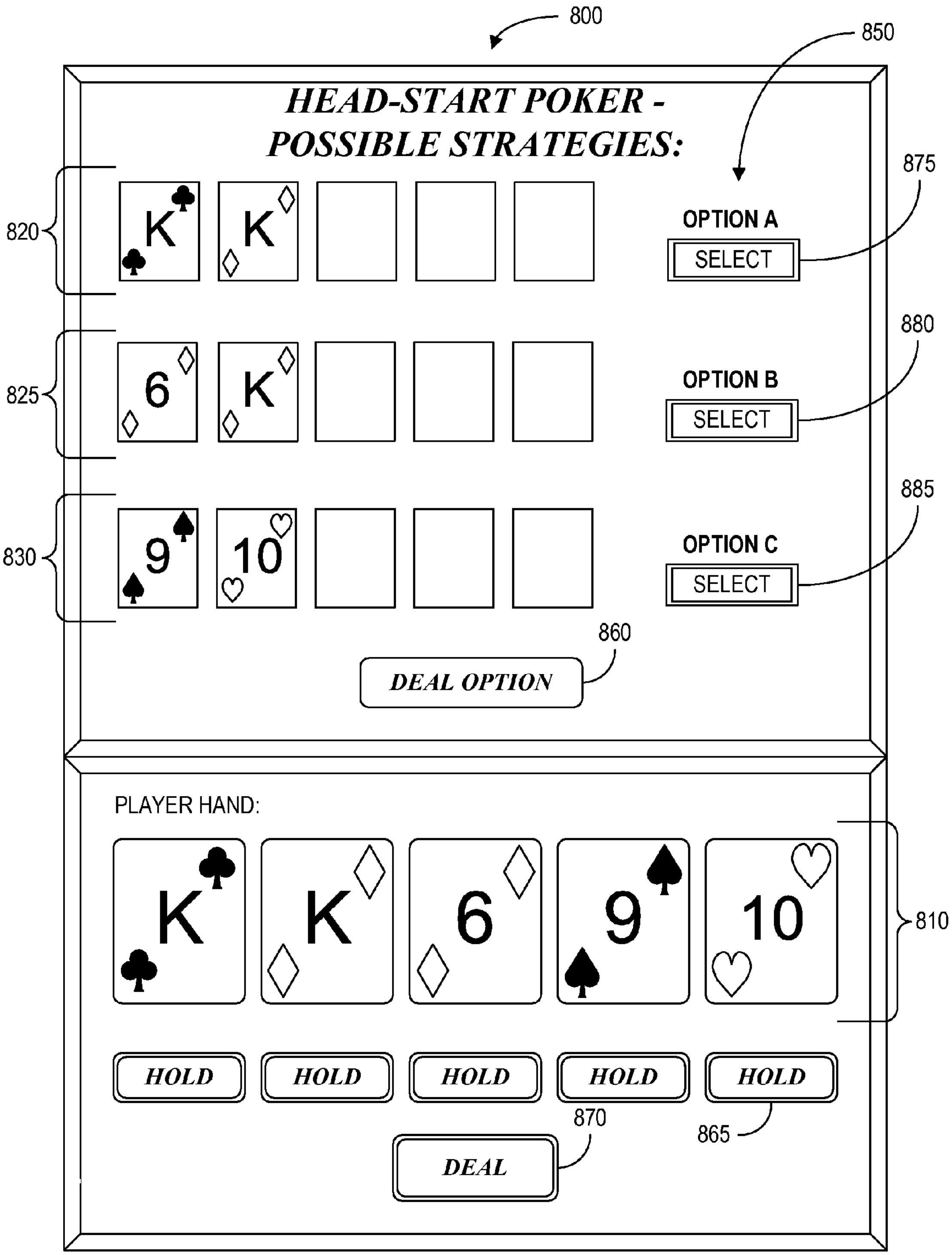
FIG. 8 illustrates an example of the presentation of an intermediate outcome in a primary game on a gaming device display according to some embodiments of the present invention.

The video display of a gaming device 800 in FIG. 8 shows an intermediate outcome 810 of:

K♣ K♦ 6♦ 9♠ 10♥

As illustrated in FIG. 8, the gaming device may incorporate a secondary video display 435 to display potential strategies that a player can select to generate a first game outcome. In this case, as illustrated in FIG. 8, three separate strategies are shown 820, 825, 830.

The player (or the gaming machine) next determines the strategy to employ (e.g., which cards to replace with randomly selected cards) to generate a first game outcome based on the intermediate outcome 810. In this video poker embodiment, the player selects one or more discards from a five-card video poker hand (e.g., accepts or requests a draw combination). A players selected strategy indicates to the gaming device how to determine or generate a game outcome based on the intermediate outcome or the previous game outcome. The gaming device generates a game outcome by replacing the discards defined by the draw combination with new cards, for example, from the top of an internally stored electronic deck of cards.

The strategy selected generally is predicated on the game style desired by the player. For example, some players prefer highly volatile games that reward large awards infrequently. Other players prefer low volatility games that provide small awards frequently. Further, some players' strategies are influenced by the types of winning game outcomes that they desire to achieve. For example, some players may implement game strategies that provide an opportunity to win a royal flush. The strategy employed will determine the cards (i.e., indicia) that the player desires to hold or replace.

The player may select any of the display strategies or create a customized strategy as determined by the player. FIG. 8 in the strategy display 850 displays three options (or strategies) 820, 825, 830, from which the player may select. The player may select one the options with a select button 875, 880, 885 associated with each of the strategies. If the player is satisfied with the selection of the strategy, a first game outcome may be received by activating the deal option button 860. The displayed strategies 820, 825, 830 may also be player selected using the touch-screen sensitive secondary video display.

The customized strategy can be implemented by the player by using either hold pushbuttons 865 that hold specified cards or through use of touch-screen technology that allows the player simply to touch the card to be held from the initial hand (or intermediate outcome) 810. The deal button 870 is used in conjunction with the hold buttons 835 to allow the player to receive the game outcome.

The intermediate outcome 810 and the final game outcome are generated by the gaming device's processor, which generates one or more random numbers, and may then associate these numbers with particular game symbols, such as cards or reel symbols. In some embodiments, the gaming device 230 need not generate any new random numbers, as the gaming device will only be required to deal the top card(s) from a deck, or to reveal some other random outcome that has already been determined.

Figure 9:
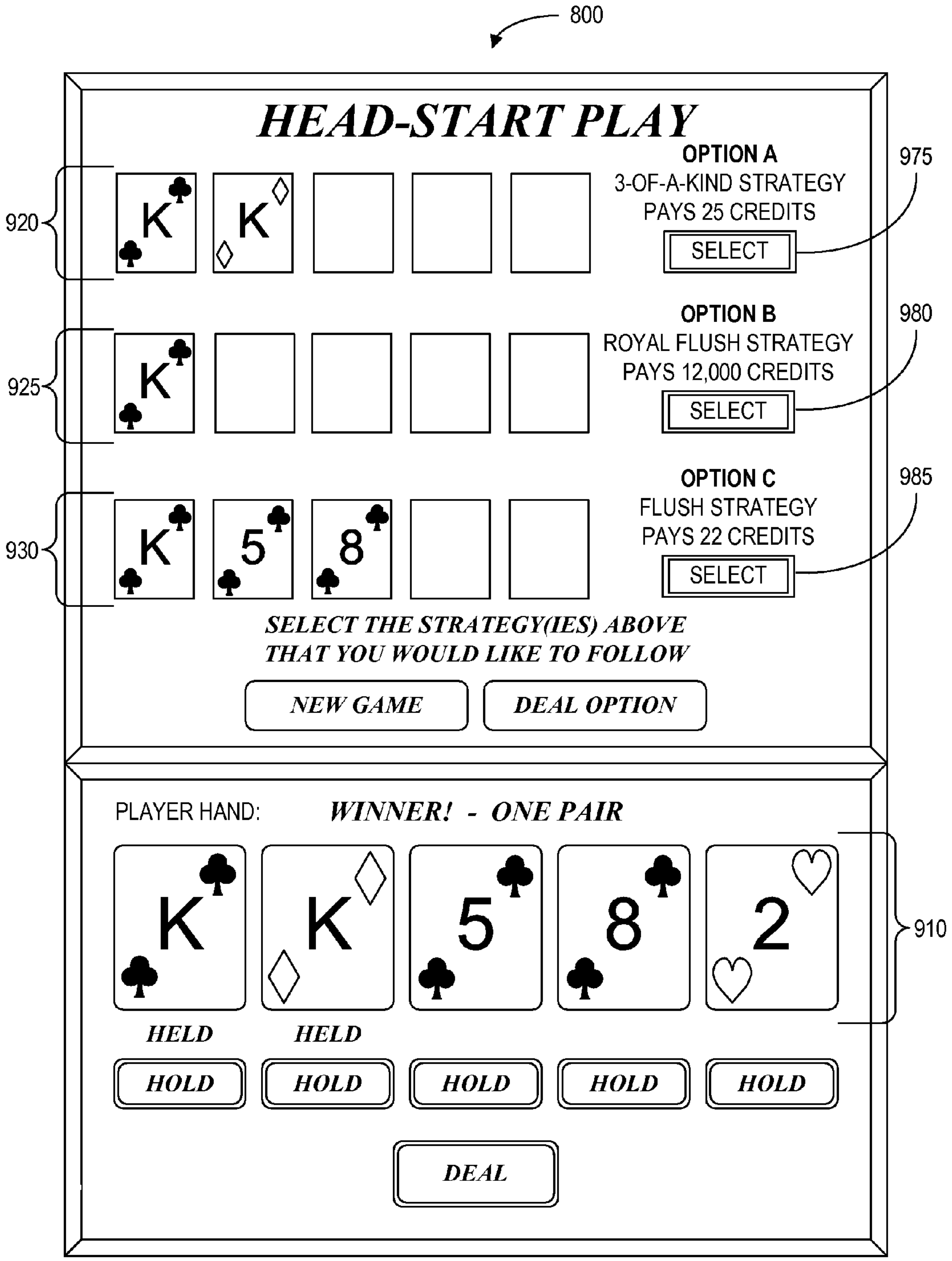
FIG. 9 illustrates a first game outcome and a presentation of a plurality of strategies for implementation in a secondary game.

In this example, the player has chosen to keep the "K♣ K♦ _ _ _" and discard the "6♦ 9♠ 10♥". The player will now receive replacement cards for these discarded cards to generate a first game outcome from the intermediate outcome. The first game outcome 910 for this example is shown in FIG. 9. FIG. 9 illustrates the first game outcome of:

K♣K♦ 5♣8♣2♥

The first game outcome 910 indicates that the player has a single pair of kings. In some embodiments of the present invention, after determining one or more game outcomes, the gaming device 230 determines which of the determined game outcomes are winning game outcomes. Accordingly, in some embodiments, the gaming device stores a pay table describing all winning game outcomes. The gaming device may then compare each of the player's outcomes to outcomes stored in the pay table. Any of the player's outcomes that match an outcome stored in the table is a winning outcome. According to a primary pay table of FIG. 12, the player is entitled to a payout of one credit for achieving a jacks or better pair in the above game.

At this point, the player may opt to play an additional hand based on the first game outcome 910. In this embodiment, the player has the opportunity to improve on the players first game outcome in an attempt to achieve a better second game outcome.

The opportunity for a second chance and the opportunity for a second game outcome may require an additional wager before the second game outcome is displayed. Alternatively, the players initial wager may include the opportunity for both a first and a second game outcome. In fact, multiple game outcomes may be available to the player after the first game outcome. Multiple game outcomes may be purchased as a single wager, fixing the number of secondary games.

This second game is based on the first game outcome 910. The player is again allowed to hold and replace cards from the last game outcome—in this case from the first game outcome—in an effort to build on the game play and potentially achieve another winning game outcome. In some embodiments, the player may determine this strategy. In other embodiments, the gaming device 230 may determine the strategy or set of strategies from which the player may select. These game strategies 920, 925, 930 as shown in FIG. 9. A second game outcome is generated from the selected strategy, which is based on the first game outcome 910. In a secondary game, the last game outcome becomes the intermediate outcome for which a strategy may be selected to generate the next game outcome.

Accordingly, a touch-sensitive display screen 435 of the gaming device 230 may prompt the player to select a "head-start" hand (i.e., strategy) based on, the last game outcome (e.g., step 740). The gaming device 230 may offer a plurality of strategies 920, 925, 930 from which the player may select. Alternatively, the player may also customize the last game outcome 910 in accordance with the player's own strategy—selecting cards to be held and discarding the remainder from the previous game outcome.

Returning to FIG. 9, the player may select one of the three strategies 920, 925, 930 offered by the gaming device by pressing the touch sensitive display screen or the appropriate pushbuttons 975, 980, 985. The display screen may provide the following options.

OPTION A

Your Head-start hand:

K♣K♦ _ _ _

Go for a 3 -of-a-kind or 4-of-a-kind! Bet 1 credit to draw 3 cards to this hand.

OPTION B

Your Head-start hand:

K♣ _ _ _ _

Go for the Royal Flush! Pays 52,000 credits! Bet 1 credit to draw 4cards to this hand.

OPTION C

Your Head-start hand:

K♣ 5♣ 8♣ _ _

Go for the flush Pays 22 credits! Bet 1 credit to draw 2 cards to this hand.

OPTION D

START OVER—Draw new hand

Each of these strategies (i.e., draw combinations) 920, 925, 930 have held selected cards from the previous game outcome 910 and discarded the remainder. Each of these strategies 920, 925, 930 are designed to obtain a winning game outcome in a second or subsequent game outcomes. These strategies typically are formed to provide the highest probability of obtaining a specific winning game outcome. A specific winning game outcome may be associated with a strategy. This specific winning game outcome is a goal or target outcome and may be the only game outcome for which the player is eligible for an award. For example, in this case, strategy 925 requires a player to obtain a royal flush to achieve a winning game outcome.

Figure 10:
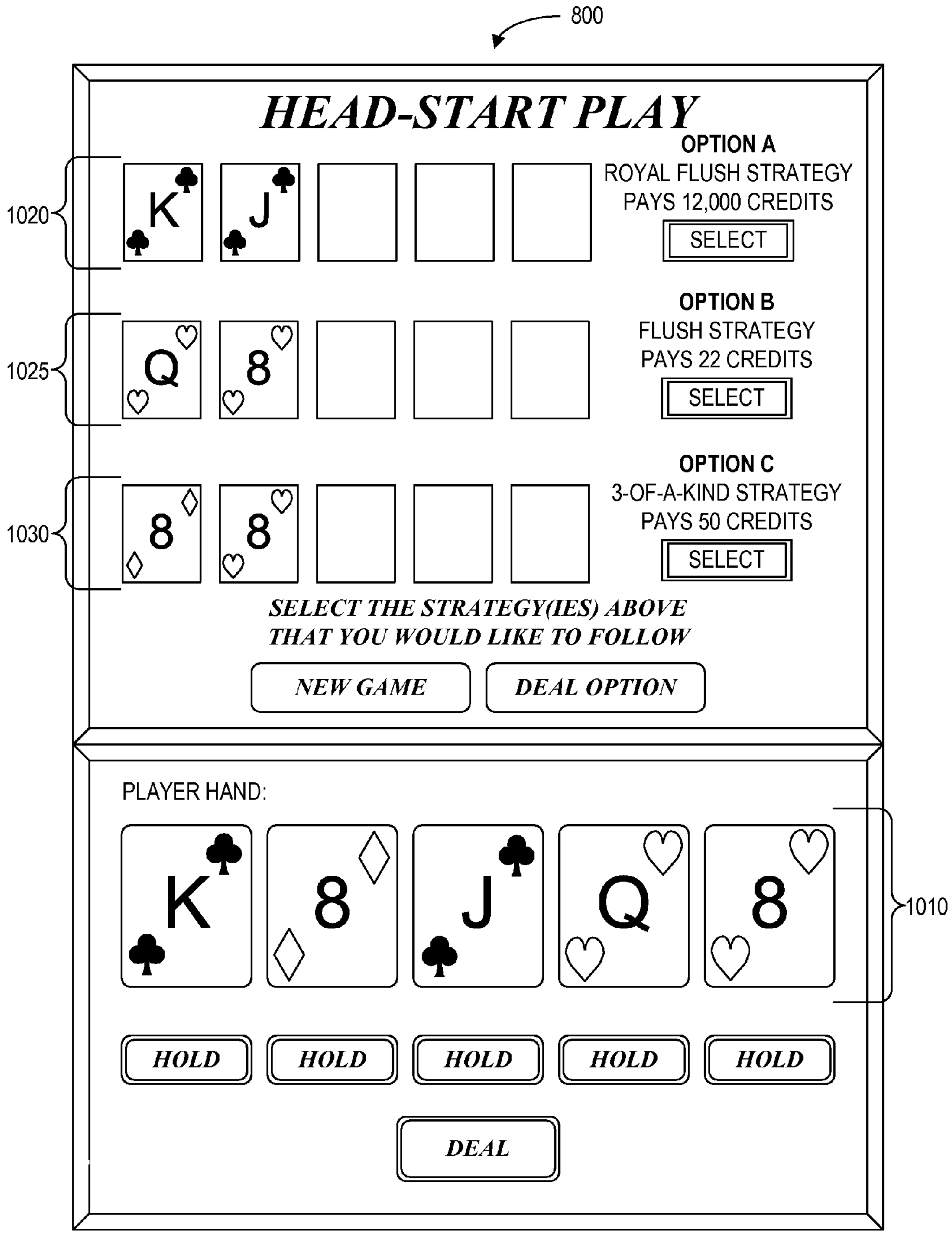
FIG. 10 illustrates a second game outcome from FIG. 9 and additional strategies selectable for generating a continuing game.

In this example, the player selected "Option B" 980 in the hope of drawing four cards to the strategy of holding "K♣ _ _ _". One credit is then deducted from the player's credit balance meter to receive the second game outcome. The player is now dealt a second game outcome 1010 illustrated in FIG. 10 of:

K♣ 8♦ J♣ Q♥ 8♥

Because the player did not achieve a winning game outcome in the second game outcome 1010, no payout is due the player. However, the player may be given an opportunity to select from several further strategies based on the last game outcome 1010 (e.g., step 750). For example, based on the game outcome 1010, the player may receive three more strategy options 1020, 1025, 1030 (i.e., strategies, illustrated in FIG. 10):

OPTION A

Your Head-start hand:

K♣ J♣ _ _ _

Go for the Royal Flush! Pays 17,000 credits Bet 1 credit to draw 3 cards to this hand.

OPTION B

Your Head-start hand:

Q♥ 8♥ _ _ _

Go for the flush! Pays 22 credits Bet one credit to draw 3 cards to this hand.

OPTION C

Your Head-start hand:

8♦ 8♥ _ _ _

Go for a 3-of-a-kind or 4-of-a-kind! Bet 1credit to draw 3 cards to this hand.

OPTION D

START OVER—Draw New Hand

In this case, the player has selected the "option C" strategy 1030 in the hopes of achieving a target goal of a three-of-a-kind. One credit may be deducted from the player's credit balance meter to receive the second game outcome. The player is now dealt a third game outcome 1110 illustrated in FIG. 11:

8♦ 8♥ 8♠ Q♦ 10♥

In this case, the player has won the target goal of three-of-a-kind and is paid accordingly. The payout for a game outcome may occur immediately after the secondary outcome has been generated. Alternatively, the payout for a secondary outcome may be made only after all game outcomes for a particular handle pull have been generated. Then, payouts from each game outcome for the handle pull may be lumped together into a single payout, and given to the player all at once.

As is well-known in the art, any distributed zero or non-zero payouts may be added to a player's credits on the gaming device, may be deposited immediately into the player's tray, or may be given to the player in the form of a ticket, receipt, or other indication of winnings. A player may take a ticket or receipt to a desk at a casino to receive the cash he is due.

In some embodiments, payouts may comprise merchandise. Merchandise may be brought to the player at the gaming device, brought to the player's hotel room, or sent to the player's home address. Payouts may also be awarded in the form of comp points; discounts on meals, shows, hotel rooms, or transportation; stamps; phone minutes; lottery tickets, and so on.

Figure 11:
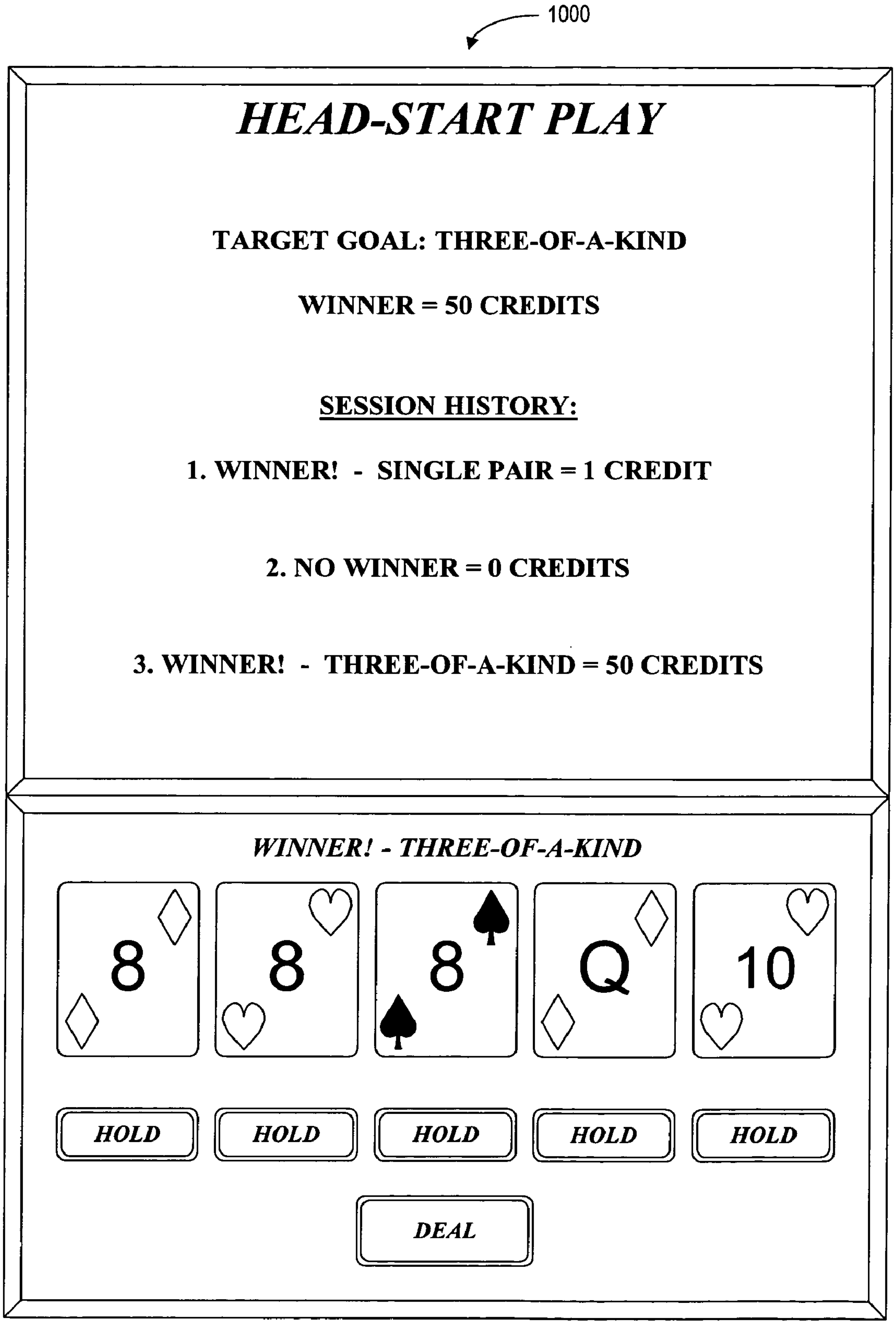
FIG. 11 illustrates an example of a second game outcome for the continuing game from FIG. 10.

As shown in FIG. 11, a session history is provided to recap the players wagering activity. In certain embodiments, the player may be limited to the number of secondary games that can be played. In this example, the player has been limited to wagering on two additional secondary games (plus the primary game). In other embodiments, the player may commit to playing a specified number of secondary games. For example, the player may require to wager three coins to play a base game plus two secondary games. At the end of the final secondary game, the session is over, and the player must start a new primary game with a new wager.

In addition to the above embodiments, additional embodiments are also possible. For example, a player allocates a wager on the three-of-a-kind strategy would win an award if the game outcome included three kings. In one embodiment however, the player could also potentially win an award for any other higher-ranking game outcome. With this embodiment, for example, the player would win an award if the game outcome included four kings (four-of-a-kind).

Alternatively, in one embodiment, the player must allocate a wager within a single strategy to become eligible to receive multiple awards for that strategy. For example, the player would be required to allocate a wager on both three-of-a-kind and on a four-of-a-kind to be eligible for both awards. If a pair of kings is showing and the player receives two additional kings, a wager on both a three-of-a-kind and on a four-of-a-kind would receive an award.

In an alternate embodiment, rather than offering the player a plurality of strategies, the player may be offered only a single strategy. For example, only the three-of-a-kind strategy may be offered. The player may be allowed to play either the strategy game or the conventional poker hand as presented in the intermediate outcome. Alternatively, the player might be allowed to play both the strategy game and the standard poker game. The player's wager is allocated as described in the above embodiments, except that part of the wager may also be allocated to the standard poker game.

In a non-skill based gaming machine (e.g., a slot-type gaming machine), no matter how the player executes the game, the payback percentage (and expected value) for the game is constant—based on the gaming machine's probability table (which determines each game outcome) and the pay table (which determines the award for each winning game outcome). The payback percentage and the expected value are predetermined by the gaming manufacturer to meet regulatory requirements and are the values that can be expected to be statistically achieved over a sufficiently large statistical sample of many thousands of game outcomes. The predetermined expected value and the pay table (which retains constant awards for winning game outcomes) ensures attaining the gaming machine's predetermined payback percentage. In some embodiments, this pay table is the primary pay table associated with the primary game.

It should be noted that a gaming machine may be operated with any one of many pre-determined expected values programmed into most gaming devices. For example, the gaming machine may be programmed with three different independently selectable predetermined expected values. The operator of the device may then determine which predetermined expected value the gaming machine uses by appropriately configuring the gaming device.

In a skill-based gaming machine (e.g., a video poker type gaming machine), the skill of the player will determine how well the player is awarded by the gaming machine. However, skill -based gaming machines still have a defined predetermined payback percentage (or expected value). In the case of skill-based gaming machines the predetermined payback percentage/expected value is determined based on perfect statistical play of the gaming machine. A player who does not play perfectly will realize a smaller expected value than the predetermined expected value of the gaming machine. Consequently, in a skill-based gaming machine, the predetermined expected value is based on perfect play of the game.

In addition to the expected value of the overall game, intermediate game outcomes occur with their own expected values. For example, a player in an intermediate game outcome may have acquired four diamonds to a flush. The potential for acquiring a fifth diamond to complete the flush hand are very high. Consequently, the expected value of the intermediate outcome is much higher than a game formed by five random cards. The expected value for this intermediate game outcome can be determined statistically. This specific intermediate outcome is relatively isolated. Many other potential intermediate outcomes are possible in the overall game play and such an individually specific expected value does not necessarily relate to the overall predetermined expected value—except to the extent that all of the individual intermediate outcomes were tallied for their effect on the overall game play. However, the selection of a non-optimal intermediate outcome will adversely affect the predetermined expected value of the game.

Those pay tables that award more limited wining game outcomes, or vary the award amount, or otherwise deviate from the primary pay table are secondary pay tables and are associated with individual strategies in the secondary and sometimes the primary game. These secondary pay tables are generally modified versions of the primary pay table. The expected value of each individual strategy may be determined and the pay table structured to ensure this expected value whenever the pay tables are modified. Modified pay tables may produce substantially the same expected value for a given strategy. Consequently, a single strategy may have associated with it a plurality of modified pay tables. The single strategy and each associated modified pay table may produce substantially the same expected value.

The modified pay table may be limited to a single selected target or goal, eliminating payouts for any other awards, including all other awards shown in the primary pay table. For example, rather than paying awards from the primary pay table 1200, a selected strategy may only pay an award for a winning game outcome (i.e., for a target goal) associated with that strategy—or limited awards except for one large award for the target goal as shown in pay table 1300 in FIG. 13. Because only one strategy is substantially awarded, that award may be much larger than an award for the same winning outcome provided by a primary pay table with its plurality of winning game outcomes. Alternatively, the primary pay table may be modified to provide the same awards as the primary pay table 1200, except have fewer potential winning game outcomes as shown in the modified winning game outcome pay table 1400 in FIG. 14. The use of modified pay tables in this game is described below.

A payout amount associated with a particular strategy option may vary based on the strategy. For example, if a player is able to construct a strategy of "K♣ J♣ _ _ _," the payout amount associated with achieving a royal flush may be less than a payout amount associated with achieving a royal flush if the player is only able to construct a strategy of "K♣ _ _ _" (a strategy that is far less likely to produce a royal flush).

Because the player may have a substantial "head-start" toward a winning game outcome in the second game outcome, the pay tables must be adjusted for the expected value of the strategy selected in order to maintain a desired expected value for the game. Although the game play mechanic starts with a primary pay table associated with the primary game to provide a predetermined expected value for a randomly selected card hand, the expected value of each strategy for the secondary game (based on the known cards in that hand) will differ from the predetermined expected value.

The expected value of each strategy in the secondary game can be determined using Monte Carlo type statistical simulations for each potentially winning game outcome provided in the modified pay table. Knowing the expected value of each strategy allows the calculation of a secondary pay table that is associated with a specific strategy. The secondary pay table is generally a modification of the primary pay table that may or may not produce the same expected value, may have the same or different awards for the same winning game outcome, and may have the same or different winning game outcomes.

Most gaming jurisdictions require a minimum expected return from the gaming machine. For example, a strategy may use a modified pay table provided that the modified pay table and the strategy produce an expected value equivalent or greater than the expected value for the strategy using the primary pay table (to meet the minimum expected value required for the game and satisfy gaming regulations). Using this methodology, the expected value of the game can be maintained each time a player decides to place an additional wager to obtain another game outcome.

The expected value of holding a particular combination of cards of a draw poker hand, given a particular pay table that correlates winning outcomes to payout amounts for winning those outcomes, may be determined by (i) simulating a large number of draws to such a hand (e.g., 100,000), each game play associated with a particular bet amount (e.g., 1 coin is bet per game play, such that 100,000 total coins were wagered in the simulation); (ii) determining a number of times in the simulation a player achieves each possible winning combination given the held cards (e.g., based on holding a pair of kings and discarding, a completed card hand may achieve 3-of-a-Kind x times, 4-of-a-Kind y times, and so on); (iii) multiplying the number times the player achieves each possible winning combination by the number of coins won for achieving that combination, so as to determine a total number of coins paid for each possible winning outcome in the simulation (e.g., in the simulation, a player achieved 3-of-a-Kind x times, and the payout for 3-of-a-Kind based on a 1-coin bet is 15 coins, making 15× the total number of coins paid out for 3-of-a-Kind outcomes during the simulation); (iv) adding the total number of coins paid for each possible winning combination together, so as to determine a total number coins paid out during the simulation; and (v) dividing the total number of coins paid out during the simulation by the total number of coins bet during the simulation.

For example, given a strategy of holding "K♦ K♣Q♦ 4♦ J♦", hold cards of "K♦ K♣ _ _ _ ", a 1-coin wager and a standard Jacks or Better pay table, the expected value of holding "K K♣ _ _ _ " is 1.536. This means that a player on average will win 1.536 coins for every coin wagered with the indicated strategy and holding the pair of kings. Consequently, all pay tables associated with the strategy (i.e., holding a pair of kings) may be structured to return this expected value.

Alternatively, rather than holding the pair of kings, the player may decide to hold all the diamonds in the previous game outcome in an attempt to obtain the target goal of a flush. The probability for obtaining a flush based on this game outcome is determined and all associated pay tables may be structured to obtain the expected value determined for the strategy.

In session play, wherein a player pays one wager to obtain a number of game outcomes, a similar statistical analysis can be performed to determine an appropriate pay table that can be used for each game outcome. Alternatively, if desired, a plurality of pay tables can be used for each of the game outcomes—generally limiting either/or both of the award amounts and the potentially winning game outcomes to maintain the overall expected value of the session play. Each of the pay tables may have the same winning game outcomes, or the game winning game outcomes may be limited as the game progresses. Similarly, the awards provided in each pay table may be limited as the game progresses.

The modified pay tables may use altered award values to affect the volatility of the game and present alternate wagering strategies for players. The payout table and the probability of winning determine game volatility. Game volatility reflects the size and regularity of payouts. For example, a game with frequent small payouts is a low volatility game in contrast to a game that provides large payouts infrequently (a highly volatile game).

For example, assuming the strategy of holding the pair of kings described above has the highest expected value of the strategies presented in the strategy display, any associated pay table calculated for this strategy must have at least an expected value of 1.536. Using the Monte Carlo probability analysis discussed above for this strategy, any combination of awards for the winning game outcomes that produces this expected value (or better) will achieve the overall predetermined expected value for the game. For example, assuming the target goal is three-of-a-kind and only pays for this winning outcome, the number of three-of-a-kind occurrences in the statistical analysis can be used to determine the minimum award necessary to meet the predetermined expected value of the game based on the expected value of the intermediate outcome.

Although the game play mechanic starts with a primary pay table and a predetermined expected value for a randomly selected card hand, the expected value of each strategy (based on the known cards in that hand) will differ from the predetermined expected value. One of the strategies determined will have the highest expected value. Other strategies may have a higher winning game outcome probability. Regardless of the probability of winning, however, most gaming jurisdictions require a minimum expected return from the gaming machine.

Assuming that the strategy with the highest expected value is presented, alternate strategies may also be simultaneously presented for selection despite the fact that they may have a lesser expected value. These non-optimal strategies, as well as the optimal strategy, may award winning game outcomes using the primary pay table. This ensures that a player playing perfect poker can achieve the predetermined expected value.

The strategy with the highest expected value may use the game's primary pay table to achieve the predetermined expected value. A conventional poker game pays winning game outcomes as stated on a primary pay table. The primary pay table includes a plurality of winning game outcomes, and is not limited to a target outcome (also known as a goal or target of the strategy) that is associated with a specific strategy. Those pay tables that award more limited wining game outcomes, or vary the amount of the award are termed modified award tables and are associated with individual strategies.

For example, rather than paying for all winning game outcomes according to the primary pay table, a selected strategy may only pay an award for a winning game outcome associated with a specific strategy. Because only one strategy is awarded, that award may be a much larger than the award that could otherwise have been paid per the primary pay table.

The expected values of each of the presented strategies as well as the strategy that provides the highest expected value may be used as the baseline for determining modified pay tables associated with each strategy. The modified pay tables use altered award values to affect the volatility of the game and present alternate wagering strategies for players. The payout table and the probability of winning determine game volatility. Game volatility reflects the size and regularity of payouts. For example, a game with frequent small payouts is a low volatility game in contrast to a game that provides large payouts infrequently (a highly volatile game). However, these modified pay tables must still meet the minimum required expected value of the game.

For example, the highest expected value strategy may use a modified pay table provided that the modified pay table and the best strategy produce an expected value equivalent or greater than the expected value for the strategy using the primary pay table (to meet the minimum expected value required for the game and satisfy gaming regulations).

If desired, a single strategy may have associated with it a plurality of modified pay tables. Each pay table may have substantially the same expected value, but different possible winning game outcomes and pay out values for those winning game outcomes. The player may select one of the pay tables to associate with the strategy, allowing the player to determine the volatility of the game.

In still another embodiment, the non-optimal strategies may also use modified pay tables. These modified pay tables may be designed to produce the same expected value as the optimal strategy. In standard conventional play, the predetermined expected value can only be achieved if the optimal strategy is selected by the player during each game play. Any non-optimal strategy selected will reduce the expected value of the gaming device for that player.

By providing a player with a plurality of game strategies, each with the same expected value, the player is never penalized by selecting a non-optimal strategy. Furthermore, it provides the player an opportunity to selectively determine the volatility of the game. It also allows a player to select the type of winning game outcomes the player would like to target without experiencing an expected value penalty for that selection. In general, this embodiment provides players with the opportunity to play any strategy they desire without the expected value penalty and without fearing the selection of a non-optimal choice.

In addition to the above embodiments, additional embodiments are also possible. For example, a player places a wager on the three-of-a-kind strategy would win an award if the game outcome included three kings. In one embodiment however, the player could also potentially win an award for any other higher-ranking game outcome. With this embodiment, for example, the player would win an award if the game outcome included four kings (four-of-a-kind).

In still another embodiment, a player may select a subset of cards from any previous game outcome to create a strategy. For example, in a third secondary game, the player may select a subset of cards that contains cards from both the first game outcome and the second game outcome. In some embodiments, the number of game outcomes from which cards may be selected may be limited. In still other embodiments, the number of cards that can be held from each of the previous game outcomes may also be limited.

Alternatively, in one embodiment, the player must allocate a wager within a single strategy to become eligible to receive multiple awards for that strategy. For example, the player would be required to allocate a wager on both three-of-a-kind and on a four-of-a-kind to be eligible for both awards. If a pair of kings is showing and the player receives two additional kings, a wager on both a three-of-a-kind and on a four-of-a-kind would receive an award.

The player may, in one embodiment, allocate wagers among both the strategy games and the conventional poker game. The player may, dependent upon the allocation of the wager, play only the strategy games (or a single strategy game), the conventional game, or a combination of both the conventional and the strategy games.

Still another aspect of some embodiments incorporates human factors that make execution of the game play easier, faster, and more accurate for the player. This is accomplished by graphically displaying gaming strategies (e.g., those with the highest expected value) in a display separate from the intermediate outcome. This graphical representation may include displaying the card indicia of the card hand in the strategy display 850 of FIG. 8. Furthermore, each strategy is individually selectable allowing the player to easily and accurately wager on a strategy with a single actuation.

This is in sharp contrast to the prior art gaming machines that are typically equipped with individual "hold" buttons that must be separately and individually actuated to hold or discard each individual card in the card hand. The player must make two or three selections on average to play a standard five-card poker hand. During this process, because of the number of actuations the player must make, the player can potentially mistakenly hold the wrong card. Selection errors must be corrected by the player, slowing the game and producing tedium for the player.

With the strategy display, the most probable strategies are graphically displayed to the player. This speeds game play, assisting the player in recognizing the best strategies and helping to ensure the player does not miss a possible strategy. With the assistance provided by the strategy display, the player plays more confidently and more quickly, secure in the knowledge that the best strategies have been displayed to the player. As a result, game play can be accomplished more quickly, more accurately, and with less player fatigue. If desired, to further increase the speed of game play, statistical probabilities can be associated with each strategy to further assist the player in selecting a strategy.

The strategy display can be used to help players interpret the intermediate outcome into a plurality of strategies. The strategy display speeds game play and helps the player make decisions and recognize strategies. The player may select the strategy of choice, after which standard game play can resume. If desired, the player may select a plurality of strategies. Each of the strategies selected is then translated into a separate game in accordance with the particular rules of the underlying game play. The strategy display speeds game play and assists the player in making decisions and recognizing strategies.

Assuming that the strategy with the highest expected value is presented (to ensure the predetermined expected value of the game is met), alternate strategies may also be simultaneously presented for selection despite the fact that they may have a lesser expected value. In standard conventional play, the predetermined expected value can only be achieved if the optimal strategy is selected by the player during each game play. Any non-optimal strategy selected will reduce the expected value of the gaming device for that player. These non-optimal strategies, as well as the optimal strategy, may award winning game outcomes using the primary pay table for the first game outcome.

If desired, modified pay tables may be substituted for the primary pay table for these strategies. For example, the expected value of the optimal strategy may be structured into a modified pay table. The non-optimal strategies may also use modified pay tables. Non-optimal strategies also have an expected value that can be calculated using the same method described above. A modified pay table may be structured to produce the expected value of the non-optimal strategy. Alternatively, the modified pay table can be structured to produce the same expected value as the optimal strategy.

In one further embodiment, the player may allocate a wager among several different strategies to obtain multiple game outcomes from a single previous game outcome. In this embodiment, a single game may branch into multiple game outcomes at each continuation level. For example, a single intermediate outcome is to start a game session may result in three first game outcomes and nine second game outcomes assuming that the player wagers on each of three strategies presented for the intermediate outcome in the first game outcome respectively.

The following describes various ways by which a gaming device may determine one or more strategies (presented as options) for generating a game outcome based on an intermediate outcome. Determining a strategy may include, for example, the gaming device determining one or more strategies to offer to the player as options. Such a determination may be based on the intermediate outcome and/or various predetermined criteria, some of which are described below.

Alternatively, or in addition, determining a play option or strategy may include receiving an indication of: (i) an acceptance of a player of one or more options, (ii) a selection by a player of one or more options, (iii) a preference of a player for one or more options, (iv) an instruction by a player to continue play according to one or more play options, and/or (iv) a request by a player for one or more options. Any such indications may be received, for example, from a player, from a device operated by the player, from a server, from a casino employee or representative, from another gaming device, and/or from a memory medium (e.g., a smart card, a storage device of the gaming device).

In some embodiments, a player presented with multiple strategies may touch text identifying the desired strategy on the screen to indicate his strategy selection. Alternatively, if each of the presented strategies is numbered, the player may touch a button on his gaming device having a corresponding number. By pressing the button, the player indicates to the gaming device that the player wishes to pursue a game outcome using the option (e.g., draw combination) associated with the button). The player might also key in the number of his desired strategy using a keypad. Many other ways of accepting, selecting, or requesting strategies are possible.

To list strategies available to the user, the gaming device may determine one or more possible strategies and/or may receive an indication of one or more possible strategies from a server. Alternatively or in addition, a gaming device may: (i) determine a subset of determined available options to represent to the player; (ii) determine an order in which to represent any available strategies.

There are various ways for the gaming device to determine what strategies to present to the user. The gaming device may identify strategies having expected payouts that meet certain criteria. For example, the gaming device may, for a particular initial hand, list all possible strategies with expected payouts in excess of 0.6 tokens. For a weaker initial hand, the gaming device might list all possible strategies with expected payouts in excess of 0.5 tokens. In some embodiments, the gaming device may determine options having an expected return above a predetermined threshold, below a predetermined threshold, or within a range. In another example, the gaming device may always just list the strategies that have the highest expected value.

Strategies that maximize the possibility of particular secondary outcomes may be identified. For example, the gaming device may always list strategies that give the player the opportunity to achieve a straight-flush. In this example, if a player held A♦, 10♦, 6 ♣, 4♥, 2♠, the gaming device would list holding just the A(d) and 10(d) as a possible strategy in order to allow the possibility of a royal-straight-flush in diamonds.

In some embodiments, the player may describe his preferred strategies and may authorize the gaming device or the casino server to execute the strategies for him automatically. In these embodiments, the player may further enter preferences as to how the gaming device should choose strategies for the player based on the outcomes of prior handle pulls. For instance, if the player has recently won a large payout, the player may wish to press his luck and may wish for the gaming device to pursue strategies with high maximum payouts. If the player has been on a losing streak, then the player may wish simply to break the losing streak with any winning outcome at all. Therefore, during a losing streak, the player may wish for the gaming device to pursue safe strategies, such as those that guarantee a payout.

In some embodiments, strategies that are similar to those previously employed by a player (or users) may be identified. For example, a casino server may maintain a database of strategies, such as session database 600, that a player has employed in previous handle pulls. When a given intermediate outcome occurs, the server may search the database for similar intermediate outcomes that had occurred for the player during prior handle pulls. The casino server would then determine the strategy the player had followed, and would present a similar strategy for the present situation. If a number of similar intermediate outcomes had occurred previously for the user, the casino server may discern several different strategies the player had previously chosen, and may then present multiple strategies in the current situation, each similar to a strategy previously chosen.

Any preferences the player has entered may be linked to the player via a player identifier, such as a player tracking card number. For example, as illustrated in player database 480, a player's preferred strategies are associated with a player identifier stored, in some embodiments, by the casino server. In such embodiments, when a player inserts his tracking card into the card reader of a gaming device, the gaming device may communicate the tracking card number to the casino server. The casino server may then identify the player's preferences by looking up the tracking card number in the player database, and retrieving the associated preferences. The casino server may then transmit these preferences back to the gaming device. The gaming device may then make use of the preferences in a number of ways described herein and apparent to those of ordinary skill in the art, including displaying potential strategies according to player preferences, or executing strategies automatically according to player preferences.

As an example, the player currently holds J♠, 9♠, 8♠ 4♦, 3♥. The processor of the casino server then executes a procedure to determine that the significant aspects of the hand are: 1) the player holds only one high card, and 2) the player holds three cards to a straight-flush. The casino server then searches session database 600 and determines that the player has in the past had fifteen hands containing both a single high card and containing three cards to a straight-flush. In eight of those cases, the player chose to keep the three cards to the straight-flush and to discard the others. In five of those cases, the player chose to keep the high card and to discard the four others. In two of those cases, the player discarded all five cards. Therefore, in the present situation, the casino server may cause the player's gaming devices to present the following strategies to the user: 1) hold only the J♠, 9♠, 8♠; 2) hold only the J♠; and 3) hold nothing.

The gaming device may show all possible strategies to the user. In many video poker embodiments, each strategy consists of five binary decisions, each decision being whether to hold one of the cards. Combining five binary decisions makes for a total of 25, or 32 total possible strategies.

Of course, a determination and/or identification of strategies to communicate to a player may rely on any combination of the above methods. For example, the casino server may always display strategies with either an expected payout above one token, or that involve holding three cards to a straight-flush.

The gaming device may display an option to the player that corresponds to all strategies not currently shown (or to some strategies not currently shown). The options, for example, may correspond to be an area on the touch-screen that says "New Strategy" or "Other". If the player then touches the "New Strategy" area, additional strategies may be shown.

Alternatively, the player may have the opportunity to manually enter a strategy. That is, rather then selecting a strategy that is already fully described by either text or by a hand with three cards discarded, the player may touch individual cards in a five-card hand to manually indicate his discards (and/or cards to be held).

When potential strategies are displayed to the user, the gaming device may determine an order in which they are displayed. The following are exemplary methods for ordering possible strategies:

- Strategies are ordered according to their expected payouts
- Strategies are ordered according to the standard deviation of their payouts
- Strategies are ordered according to each strategy's maximum potential payout
- Strategies are ordered according to each strategy's minimum potential payout
- Strategies are ordered according to their chances of achieving a particular outcome, or one of a set of outcomes (e.g., a strategy that is most likely to result in royal-straight-flush is listed first, a strategy that is most likely to achieve one of a straight, flush, or full-house is listed first).
- Strategies are ordered according to the number of discards required. (e.g., a strategy using no discards is listed first, followed by strategies with one discard, etc.)
- Strategies are ordered according to the relative frequency with which the player has employed similar strategies in the past The ordering schemes described above may put strategies in ascending or descending order according to the various criteria, such as expected value or standard deviation in payouts. Further, as will be understood, any combination of the above ordering schemes may be used. For instance, a list of strategies ordered according to their expected payouts may be interwoven with a list of strategies ordered according to their likelihood of achieving a flush. As another example, strategies may be ordered according to their expected payouts. However, two strategies with equal expected payouts may be ordered according to their maximum possible payouts.

In addition to listing possible strategies for the player to choose, the gaming device may list various facts or information related to each strategy. Exemplary facts may include the following:

- An expected payout of the strategy
- One or more potential outcomes that can be achieved using the strategy
- The standard deviation in the payout of the strategy
- The odds or probability of achieving one or more outcomes using the particular strategy (e.g., for a strategy that involves holding the 11♥, 10♥, 8♥, 7♥, and the gaming device might display the odds of achieving a straight-flush as "46 to 1 against").
- The maximum payout that can be achieved using the strategy
- The minimum payout that can be achieved using the strategy
- The number of times a similar strategy has worked for the player in the past, or in the past N hands, or in the past N hands in which the similar strategy has been used.
- The number of times a similar strategy has worked for another player in the past (e.g., a message that "your neighbor just hit two draws to a straight-flush in a row.")
- An enticement for choosing the corresponding strategy

Additional Embodiments

The following are several examples that illustrate additional embodiments of the present invention. These examples do not constitute a definition of all possible embodiments, and those skilled in the art will understand that the present invention is applicable to many other embodiments. Further, although the following examples are briefly described for clarity, those skilled in the art will understand how to make any changes, if necessary, to the above-described apparatus and methods to accommodate these and other embodiments and applications.

Many descriptions herein focus on some embodiments of the present invention where a player is at a video poker machine, such as a 9/6 JACKS OR BETTER™, DEUCES WILD™, or JOKERS WILD™ machine. Of course, some embodiments of the present invention are additionally and/or alternatively directed to a player playing a reel slot game, blackjack, craps, war, pai gow, pai gow poker, and/or other machine and table games. Further, as described above, some embodiments of the present invention are directed to a player gambling from a remote location. For example, a player may gamble at a Web-based casino from a remote computer in communication with a casino server via the Internet. The present invention is not limited to poker type games as the following examples illustrate.

For example, the present invention could be incorporated into a reel slot type gaming device. A player can achieve an initial game outcome (i.e., intermediate game outcome) with a first handle pull. The slot machine may display a set of indicia that determine a winning game outcome on one of a plurality of possible pay lines. The initial intermediate outcome may provide a winning game outcome if the indicia is aligned on a pay lines in accordance with a pay table. The player may select indicia on the display to be held over, the remainder respun (i.e., discarded) in the next handle pool to determine the first game outcome. A determination is made whether this first game outcome is a winning game outcome in the player paid according to a pay table. The player may then place an additional wager to obtain a second game outcome generated from indicia held in the first game outcome. This process may continue in a series of secondary games, In a similar matter in the present invention can also be applied to the game of blackjack. In one embodiment related to blackjack, an intermediate outcome consists of a player's two-card hand, and the house's upturned card. The player may then choose among several options to play out the hand, including whether to hit, stand, split, double down, or surrender. In this embodiment, the player may receive a first game outcome and hold pending the completion of the dealers hand. A winning card hand for the dealer allows the player to obtain a second game outcome with an additional wager. The player is allowed to obtain additional cards and may or may not be allowed to discard cards before the additional cards are drawn. This modifies the player's first game outcome to create a second game outcome. The same general rules of blackjack applied to both the first and the second games. A player may be required to place all wagers at the beginning of game play, before the intermediate outcome is dealt, to be eligible for secondary games. The secondary games may or may not be used by the player.

In some embodiments directed to pai gow poker, an intermediate may comprise seven cards dealt to a player. The player must then choose how to divide the seven-card hands into a five-card hand and a two-card hand. The player's strategy, therefore, includes how to divide his hand (e.g., a designation of which cards to contribute or assign to which of the two hands). After the player has made two separate hands, the banker will do the same. The player's hands are then compared to the banker's hands in order to determine whether the player has won, lost, or pushed. The two player hands may be described as a first game outcome. The player may then have an opportunity to acquire replacement cards for either one or both hands to determine a second game outcome in an effort to beat the bankers hands. The second game outcome may require an additional wager before the game commences, acting as a type of insurance for the player. Alternately, the wager for the additional game outcome may be placed during game play.

In some embodiments, outcomes of games of chance may comprise, without limitation, a slot reel, a slot reel symbol, a card, and/or a hand of cards. Other types of game elements or symbols and configurations of such elements are well known in the art. In some embodiments, the intermediate outcome is a losing outcome according to a payout table associated with the game of chance. In some embodiments, the intermediate outcome and/or target outcome are predetermined (e.g., by a casino); the player is not given a choice.

An intermediate outcome may be any random or non-random set of information, including, without limitation, a configuration of symbols displayed at a gaming device, or a set of cards that appear face-up and/or face-down at a gaming device. Some exemplary intermediate outcomes are:

"A♥, A♠, A♦, J♥, 4♥" (e.g., appearing on a video poker machine)

Dealer: K♠ unknown; Player: "10♦, 2♥" (e.g., appearing on a video blackjack machine)

In some embodiments, an intermediate outcome is generated automatically, without initiation by the player. In one embodiment, the intermediate outcome is always the same outcome (or is always from a predetermined set of outcomes); the player does not get to designate a desired intermediate outcome or have an intermediate outcome generated. For example, the intermediate outcome in a video poker game might always be: K♠, Q♠, J♠, 10♠, 2♦. This intermediate outcome would, advantageously, always invite a player to draw to a royal flush, an exciting outcome in video poker.

In other embodiments, the player chooses the intermediate outcome. The player may, for example, choose to have an initial hand of blackjack be: 9-9. The player then, as desired, would be able to both "stand" on the initial hand and also pursue a "split" with the initial hand.

For example, for a player holding a hand of "J♠, 10♠, 9♠, 8♠, 5♥", in video draw poker, the gaming device may determine target outcomes of any straight, and/or any flush. Thus, the gaming device may determine a draw combination to suggest would be to discard only the 5♥ (holding the other cards). With this draw combination, if the player draws any spade, then he achieves a target outcome of a flush. If the player draws a seven of spades or a queen of spades, then he achieves a straight flush.

In a video poker embodiment, the game outcomes may be generated from an infinite deck, from a constant deck, or from a diminishing deck. In an infinite deck embodiment, the likelihood of drawing any card (with the possible exception of cards currently in the player's hand) is the same. In a constant deck embodiment, any cards that are discarded are put back into the virtual deck, though possibly only after the next secondary outcome is generated. In some embodiments, the outcomes of two strategies are generated using the same deck of cards. In other embodiments, the outcomes of two strategies are generated using copies of the same deck of cards. In still other embodiments, different decks of cards are used.

Regardless of the number of strategies offered, a winning game outcome may be immediately obtainable in the intermediate outcome based on the conventional poker game. In such a case, the player may decide to only play the conventional poker game, avoiding the risk of losing the already winning game outcome in the strategy game.

The gaming device may perform some or all of the described functions of the server. Similarly, the server may perform some or all of the described functions of the gaming device.

Although the present invention has been described with respect to several embodiments, those skilled in the art will note that various substitutions may be made to those embodiments described herein without departing from the spirit and scope of the present invention.

We claim:

1. A gaming device comprising:

at least one display device;

at least one input device;

at least one processor; and at least one memory device which includes a plurality of instructions which when executed by the at least one processor, cause the at least one processor to operate with the at least one display device and the at least one input device, for a play of a wagering game, to:

(a) receive a first wager from a player for the play of the wagering game, the wagering game having a predetermined average expected value;

(b) generate an intermediate game outcome based on the first wager, the generated intermediate game outcome comprising a first set of symbols;

(c) generate one of a plurality of first game outcomes based on the generated intermediate game outcome, the generated first game outcome comprising a second set of symbols and being associated with a first paytable having a plurality of winning outcomes;

(d) determine whether a second wager was received from the player for the play of the wagering game;

(e) if the second wager was received:

(i) generate one of a plurality of second game outcomes based on the generated first game outcome and the second wager, the generated second game outcome comprising a third set of symbols; and (ii) select one of a plurality of different second paytables based, at least in part, on the generated first game outcome, the selected second paytable having at least one of but less than all of the plurality of winning outcomes of the first paytable, wherein the predetermined average expected value of the wagering game remains unchanged regardless of which of the plurality of different second paytables is selected;

(f) if the generated second game outcome corresponds to one of the winning outcomes of the selected second paytable, provide a first award based on the second wager; and (g) if the generated second game outcome does not correspond to one of the winning outcomes of the selected second paytable and the generated first game outcome corresponds to one of the winning outcomes of the first paytable, provide a second, different award based on the first wager.

2. The gaming device of claim 1, wherein when executed by the at least one processor, the plurality of instructions cause the at least one processor to: (i) enable designation of zero, one or all of the symbols of the generated intermediate game outcome; (ii) for each designated symbol of the generated intermediate game outcome, replace said symbol with a first replacement symbol to generate the first game outcome; (iii) enable designation of zero, one or all of the symbols of the generated first game outcome; and (iv) for each designated symbol of the generated first game outcome, replace said symbol with a second replacement symbol to generate the second game outcome.

3. The gaming device of claim 1, wherein when executed by the at least one processor, the plurality of instructions cause the at least one processor to: (i) if the generated second game outcome corresponds to one of the winning outcomes of the selected second paytable and the generated first game outcome corresponds to one of the winning outcomes of the first paytable, determine whether to provide the second, different award based on the first wager in addition to the first award; and (ii) if the determination is to provide the second, different award based on the first wager, provide the second, different award.

4. The gaming device of claim 1, wherein when executed by the at least one processor, the plurality of instructions cause the at least one processor to select one of the second paytables based, at least in part, on a probability of the generated second game outcome corresponding to a designated one of the winning game outcomes.

5. A gaming device comprising:

at least one display device;

at least one input device;

at least one processor; and at least one memory device which includes a plurality of instructions which when executed by the at least one processor, cause the at least one processor to operate with the at least one display device and the at least one input device, for a play of a wagering game, to:

(a) receive a wager from a player for the play of the wagering game, the wagering game having a predetermined average expected value;

(b) generate an intermediate game outcome, the generated intermediate game outcome comprising a first set of symbols;

(c) generate one of a plurality of first game outcomes based on the generated intermediate game outcome according to either a first strategy or a second strategy, the generated first game outcome comprising a second set of symbols, wherein for the first strategy, the generated first game outcome is associated with a first paytable having a plurality of winning outcomes;

(d) for the second strategy, select one of a plurality of different second paytables based on the generated intermediate game outcome and the second strategy, the selected second paytable having at least one of but less than all of the plurality of winning outcomes of the first paytable, the predetermined average expected value of the wagering game remaining unchanged regardless of which of the plurality of different second paytables is selected;

(e) generate one of a plurality of second game outcomes based on the generated first game outcome according to a third strategy, the generated second game outcome comprising a third set of symbols;

(f) for the third strategy, select one of a plurality of different third paytables based on the generated first game outcome and the third strategy, the selected third paytable having at least one of but less than all of the plurality of winning outcomes of the first paytable, the predetermined average expected value of the wagering game remaining unchanged regardless of which of the plurality of different third paytables is selected;

(g) if the generated second game outcome corresponds to one of the winning outcomes of the selected third paytable, provide a first award; and (h) if the generated second game outcome does not correspond to one of the winning outcomes of the selected third paytable and the generated first game outcome corresponds to one of the winning game outcomes of either the first paytable or the selected second paytable, provide a second, different award.

6. The gaming device of claim 5, wherein when executed by the at least one processor, the plurality of instructions cause the at least one processor to: (i) enable designation of zero, one or all of the symbols of the generated intermediate game outcome; (ii) for each designated symbol of the generated intermediate game outcome, replace said symbol with a first replacement symbol to generate the first game outcome; (iii) enable designation of zero, one or all of the symbols of the generated first game outcome; and (iv) for each designated symbol of the generated first game outcome, replace said symbol with a second replacement symbol to generate the second game outcome.

7. The gaming device of claim 5, wherein when executed by the at least one processor, the plurality of instructions cause the at least one processor to: (i) if the generated second game outcome corresponds to one of the winning outcomes of the selected third paytable and the generated first game outcome corresponds to one of the winning game outcomes of either the first paytable or the selected second paytable, determine whether to provide the second, different award in addition to the first award; and (ii) if the determination is to provide the second, different award, provide the second, different award.

8. The gaming device of claim 5, wherein each of a plurality of the second paytables has a same expected value, and wherein each of a plurality of the third paytables has a same expected value.

9. The gaming device of claim 8, wherein when executed by the at least one processor, the plurality of instructions cause the at least one processor to select one of the third paytables based, at least in part, on a probability of the generated second game outcome corresponding to a designated one of the winning game outcomes.

10. The gaming device of claim 5, wherein when executed by the at least one processor, the plurality of instructions cause the at least one processor to: (i) receive a second, different wager for the play of the wagering game; and (ii) in response to the second, different wager being received, generate the second game outcome.

11. The gaming device of claim 10, wherein the predetermined average expected value of the wagering game is substantially equal to a predetermined average expected value of the first paytable.

12. The gaming device of claim 5, wherein the selected second paytable has at least one different award than the first pay table.

13. The gaming device of claim 5, wherein the second pay table is associated with a plurality of but less than all of the winning game outcomes of the first paytable.

14. The gaming device of claim 5, wherein an expected value of generating the first game outcome from the generated intermediate game outcome is substantially equal to an expected value of generating the second game outcome from the generated first game outcome.

15. The gaming device of claim 5, wherein the first strategy has a first expected value and the second strategy has a second expected value which is substantially the same as the first expected value.

16. The gaming device of claim 5, wherein an expected value of generating the second game outcome from the generated first game outcome is substantially equal to the predetermined average expected value of the wagering game.

17. A gaming device comprising:

at least one display device;

at least one input device;

at least one processor; and at least one memory device which includes a plurality of instructions which when executed by the at least one processor, cause the at least one processor to operate with the at least one display device and the at least one input device, for a play of a wagering game, to:

(a) receive a wager from a player for the play of the wagering game, the wagering game having a predetermined average expected value;

(b) generate an intermediate game outcome, the intermediate game outcome comprising a first set of symbols;

(c) generate one of a plurality of first game outcomes based on the generated intermediate game outcome according to a first strategy, the first game outcome comprising a second set of symbols and being associated with a first paytable having a plurality of winning outcomes;

(d) generate one of a plurality of second game outcomes based on the first game outcome according to a second strategy or a third strategy, the second game outcome comprising a third set of symbols;

(e) for the second strategy, select one of a plurality of different second paytables based on the generated first game outcome and the second strategy, the selected second paytable having at least one of but less than all of the plurality of winning outcomes of the first paytable, the predetermined average expected value of the wagering game remaining unchanged regardless of which of the plurality of different second paytables is selected;

(f) for the third strategy, select one of a plurality of different third paytables based on the generated first game outcome and the third strategy, the selected third paytable having at least one of but less than all of the plurality of winning outcomes of the first paytable, the predetermined average expected value of the wagering game remaining unchanged regardless of which of the plurality of different third paytables is selected;

(g) if the generated second game outcome corresponds to one of the winning outcomes of the selected second paytable or the selected third paytable, provide a first; and (h) if the generated second game outcome does not correspond to one of the winning outcomes of the selected second paytable or the selected third paytable, and the generated first game outcome corresponds to one of the winning game outcomes of the first paytable, provide a second, different award.

18. The gaming device of claim 17, wherein when executed by the at least one processor, the plurality of instructions cause the at least one processor to: (i) enable designation of zero, one or all of the symbols of the generated intermediate game outcome; (ii) for each designated symbol of the generated intermediate game outcome, replace said symbol with a first replacement symbol to generate the first game outcome; (iii) enable designation of zero, one or all of the symbols of the generated first game outcome; and (iv) for each designated symbol of the generated first game outcome, replace said symbol with a second replacement symbol to generate the second game outcome.

19. The gaming device of claim 17, wherein when executed by the at least one processor, the plurality of instructions cause the at least one processor to: (i) if the generated second game outcome corresponds to one of the winning outcomes of the selected second paytable or the selected third paytable, and the generated first game outcome corresponds to one of the winning game outcomes of the first paytable, determine whether to provide the second, different award in addition to the first award; and (ii) if the determination is to provide the second, different award, provide the second, different award.

20. The gaming device of claim 17, wherein the predetermined average expected value of the wagering game is substantially equal to a predetermined average expected value of the first paytable.

21. The gaming device of claim 20, wherein the second strategy has a first expected value and the third strategy has a second expected value which is substantially the same as the first expected value.

22. The gaming device of claim 21, wherein each of a plurality of the second paytables has a same expected value, and wherein each of a plurality of the third paytables has a same expected value.

23. The gaming device of claim 17, wherein when executed by the at least one processor, the plurality of instructions cause the at least one processor to: receive a second, different wager for the play of the wagering game; and (ii) in response to the second, different wager being received, generate the second game outcome.

24. The gaming device of claim 17, wherein the selected second paytable has a plurality of but less than all of the winning game outcomes of the first paytable, and wherein the selected third paytable has a plurality of but less than all of the winning game outcomes of the first paytable.

25. The gaming device of claim 17, wherein the selected second paytable has at least one different award than the first paytable, and wherein the selected third paytable has at least one different award than the first paytable.

26. A gaming device comprising:

at least one display device;

at least one input device;

at least one processor; and at least one memory device which includes a plurality of instructions which when executed by the at least one processor, cause the at least one processor to operate with the at least one display device and the at least one input device, for a play of a wagering game, to:

(a) receive a wager from a player for the play of the wagering game, the wagering game having a predetermined average expected value;

(b) generate a first intermediate game outcome, the generated first intermediate game outcome comprising a first set of symbols;

(c) generate a first game outcome based on the generated first intermediate game outcome, the generated first game outcome comprising a second set of symbols and being associated with a first paytable having a plurality of winning outcomes;

(d) generate a second intermediate game outcome from at least one of: (i) a subset of the first set of symbols, and (ii) a subset of the second set of symbols;

(e) select one of a plurality of different second paytables based on the generated second intermediate game outcome, the selected second paytable having at least one of but less than all of the plurality of winning outcomes of the first paytable, the predetermined average expected value of the wagering game remaining unchanged regardless of which of the plurality of different second paytables is selected;

(f) generate a second game outcome based on the generated second intermediate game outcome, the generated second game outcome comprising a third set of symbols and being associated with the selected second paytable;

(g) if the generated second game outcome corresponds to one of the winning outcomes of the selected second paytable, provide a first award based on the wager; and (h) if the generated second game outcome does not correspond to one of the winning outcomes of the selected second paytable, and the generated first game outcome corresponds to one of the winning game outcomes of the first paytable, provide a second, different award based on the wager.

* * * * *

UNITED STATES PATENT AND TRADEMARK OFFICE

CERTIFICATE OF CORRECTION

PATENT NO. : 7,740,533 B2
APPLICATION NO. : 11/258508
DATED : June 22, 2010
INVENTOR(S) : Walker et al.

It is certified that error appears in the above-identified patent and that said Letters Patent is hereby corrected as shown below:

In Claim 17, Column 44, Line 19, replace “first;” with --first award;--.

Signed and Sealed this

Twenty-first Day of September, 2010

David J. Kappos

*Director of the United States Patent and Trademark Office*